(12) United States Patent
Gupta et al.

(10) Patent No.: US 10,732,942 B2
(45) Date of Patent: Aug. 4, 2020

(54) AUTOMATICALLY CATEGORIZING AND VALIDATING USER-INTERFACE-DESIGN COMPONENTS USING A DESIGN-COMPONENT-NEURAL NETWORK

(71) Applicant: Adobe Inc., San Jose, CA (US)

(72) Inventors: Nikhil Gupta, Noida (IN); Shivam Mishra, Kanpur (IN); Ashish Anand, Noida (IN); Arpit Kumar Singh, Kalayanpur Kanpur (IN)

(73) Assignee: ADOBE INC., San Jose, CA (US)

( * ) Notice: Subject to any disclaimer, the term of this patent is extended or adjusted under 35 U.S.C. 154(b) by 143 days.

(21) Appl. No.: 16/126,849

(22) Filed: Sep. 10, 2018

(65) Prior Publication Data

US 2020/0081691 A1    Mar. 12, 2020

(51) Int. Cl.
| | |
|---|---|
| *G06F 9/44* | (2018.01) |
| *G06F 8/38* | (2018.01) |
| *G06F 3/0484* | (2013.01) |
| *G06F 9/448* | (2018.01) |
| *G06N 3/04* | (2006.01) |

(52) U.S. Cl.
CPC ............ *G06F 8/38* (2013.01); *G06F 3/04842* (2013.01); *G06F 9/448* (2018.02); *G06N 3/04* (2013.01)

(58) Field of Classification Search
CPC ........ G06F 8/38; G06F 9/448; G06F 3/04842; G06N 3/04
USPC .......................................... 717/124
See application file for complete search history.

(56) References Cited

U.S. PATENT DOCUMENTS

| | | | |
|---|---|---|---|
| 9,697,444 B2 * | 7/2017 | Wu ...................... | G06N 3/0454 |
| 10,310,821 B2 * | 6/2019 | Brown .................... | G06F 8/35 |

FOREIGN PATENT DOCUMENTS

| | | | | |
|---|---|---|---|---|
| CN | 108764289 A | * | 11/2018 | |
| WO | WO-2017134519 A1 | * | 8/2017 | ........... G06K 9/6256 |

* cited by examiner

*Primary Examiner* — Evral E Bodden
(74) *Attorney, Agent, or Firm* — Keller Jolley Preece

(57) ABSTRACT

This disclosure relates to methods, non-transitory computer readable media, and systems that use a design-component-neural network to categorize a design component from an interface-design file as a platform widget corresponding to a particular computing platform. Having categorized the design component as a platform widget, in certain implementations, the disclosed systems compare and validate properties of the design component against user-interface guidelines for the particular computing platform. Upon determining that the design component does not comply with a user-interface guideline, the systems can provide and implement options to modify the design component to comply with the user-interface guideline.

20 Claims, 16 Drawing Sheets

AUTOMATICALLY CATEGORIZING AND VALIDATING USER-INTERFACE-DESIGN COMPONENTS USING A DESIGN-COMPONENT-NEURAL NETWORK

BACKGROUND

Computing devices have recently implemented interface-design systems providing tools for users to design and edit user interfaces and other workflows for various software applications and computing platforms. For example, some existing interface-design systems include design tools for a user to create design components for a software application or a website that are compatible with a particular computing platform and a display-screen size. Such design tools may employ vector design or wireframing for the interface-design system to create buttons, icons, images, text boxes, or other design components for a user interface of an application or a website. By using design tools, some existing interface-design system can create design components compatible with both the specific parameters of a display screen and user-interface guidelines for a computing platform.

Despite facilitating and improving user experience design, existing interface-design systems have a number of technical challenges. As suggested above, user-interface guidelines for computing platforms generally define technical specifications for particular design components, such as parameters for bitmaps, gradients, shadowing, shapes, or sizes of design components. For instance, user-interface guidelines for one computing platform may require a particular shape, shadowing, and size for one type of button, while user-interface guidelines for another computing platform may require a different (but just as particular) shape, shadowing, and size for a same or similar type of button. Indeed, a single user interface for a particular computing platform may include design components that must satisfy a labyrinth of technical and specific user-interface guidelines.

Some existing interface-design systems include technical shortcomings that limit the accuracy and efficiency with which such systems create design components that account for different computing platform's user-interface guidelines. For example, some existing interface-design systems cannot detect or easily show to a user certain properties of a design component. Further, a designer and software developer who rely on existing interface-design systems often must engage in time intensive and tedious back-and-forth exchanges to manually adjust design components to satisfy user-interface guidelines. This tedious process can often result in unnecessary and repeated inputs by a user into the interface-design system to alter design components.

SUMMARY

This disclosure describes one or more embodiments of methods, non-transitory computer readable media, and systems that solve one or more of the foregoing problems in addition to providing other benefits. For example, in some embodiments, the disclosed systems use a design-component-neural network to categorize a design component from an interface-design file as a platform widget corresponding to a particular computing platform. Having categorized the design component as a platform widget, in certain implementations, the disclosed systems compare and validate properties of the design component against user-interface guidelines for the particular computing platform. Upon determining that the design component does not comply with a user-interface guideline, in certain cases, the systems can further provide and implement options to modify the design component to comply with the user-interface guideline.

For instance, in some embodiments, the disclosed systems provide an interface-design file containing a design component to a design-component-neural network. The design-component-neural network can, for example, comprise object-recognition layers and one or more platform-component-recognition layers. The disclosed systems further generate a design-feature indicator for the design component utilizing the object-recognition layers. Based on the design-feature indicator for the design component, the systems subsequently categorize the design component as a platform widget corresponding to a computing platform utilizing a platform-component-recognition layer. In certain implementations, the disclosed systems further determine whether the design component complies with a user-interface guideline for the platform widget. In the event the design component fails to comply, the systems optionally present within a user interface a selectable option to modify the design component to comply with the user-interface guideline for the platform widget.

Additional features and advantages will be set forth in the description which follows, and in part will be obvious from the description, or may be learned by the practice of such exemplary embodiments.

BRIEF DESCRIPTION OF THE DRAWINGS

The detailed description refers to the drawings briefly described below.

DETAILED DESCRIPTION

Figure 1:
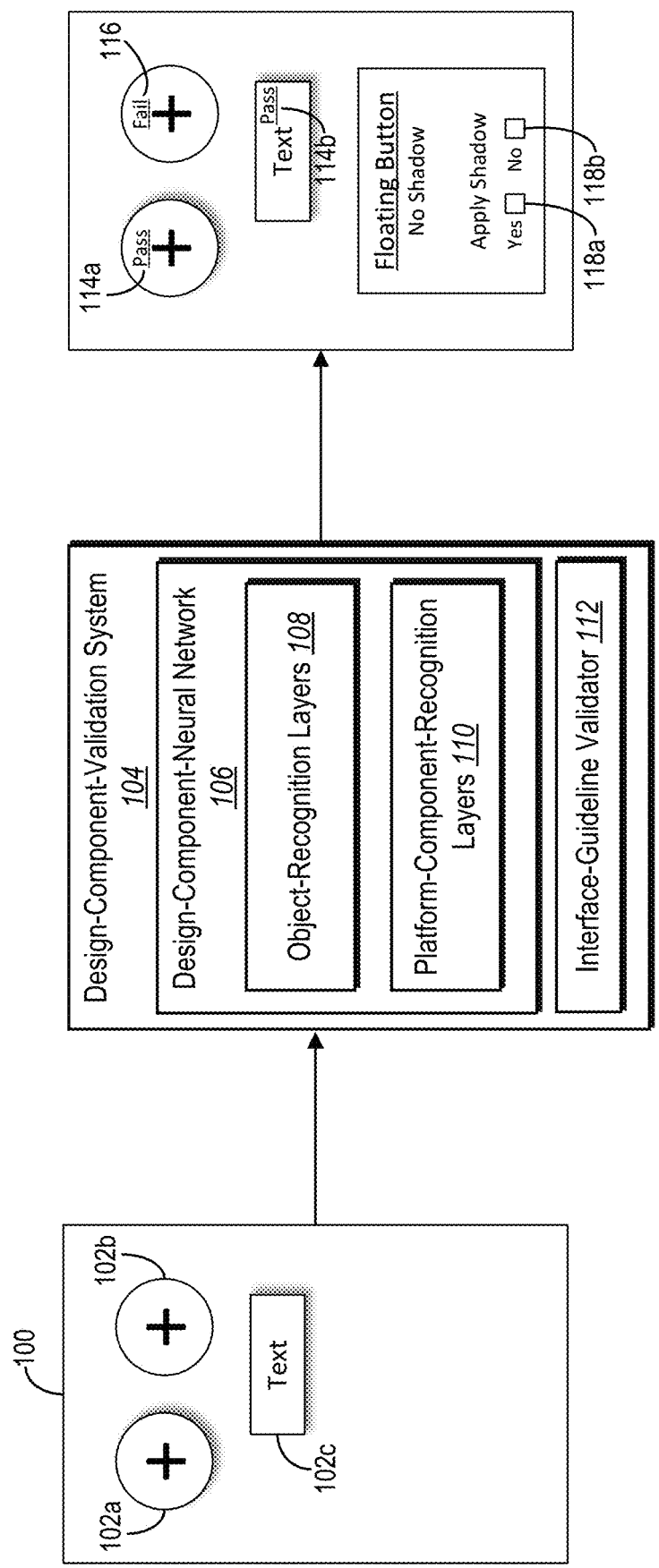
FIG. 1 illustrates a design-component-validation system categorizing a design component from an interface-design file and validating the design component against user-interface guidelines for a computing platform in accordance with one or more embodiments.

This disclosure describes one or more embodiments of a design-component-validation system that uses a design-component-neural network to categorize a design component from an interface-design file as a platform widget corresponding to a particular computing platform. Based on the categorization, in certain implementations, the design-component-validation system compares and validates properties of the design component against related user-interface guidelines for the platform widget corresponding to the computing platform. When the design-component-validation system determines that the design component does not comply with a user-interface guideline, in some cases, the system provides and implements options to modify the design component to comply with the user-interface guideline.

As indicated above, in some embodiments, the design-component-validation system uses a design-component-neural network comprising object-recognition layers and a plurality of platform-component-recognition layers. When the design-component-validation system provides the design-component-neural network with a design component from an interface-design file, the object-recognition layers generate a design-feature indicator for the design component. Based on the design-feature indicator, the various platform-component-recognition layers provide an indication to which computing platform the design component corresponds. The design-component-validation system subsequently categorizes the design object based on the indications from the platform-component-recognition layers.

When training such a design-component-neural network to categorize design components, in certain implementations, the design-component-validation system provides a training-interface-design file containing a training-design component to the network. The design-component-validation system then generates a training-design-feature indicator for the training-design component using the object-recognition layers. In some such embodiments, the object-recognition layers collectively comprise either an Inception module or a residual neural network. The design-component-validation system further categorizes the training-design component as a predicted-platform widget based on the training-design-feature indicator and training indicators of platform widgets from the platform-component-recognition layers. In some such cases, the platform-component-recognition layers comprise softmax layers.

The design-component-validation system subsequently determines a loss from a loss function from a comparison of the predicted-platform widget with a ground-truth-platform widget for a ground-truth-computing platform. Based on the determined loss, the design-component-validation system adjusts network parameters for the various layers within the design-component-neural network. By iteratively identifying predicted-platform widgets for training-design components and determining losses based on comparisons with ground-truth-platform widgets, in some embodiments, the design-component-validation system further adjusts network parameters for the various layers until reaching a point of convergence.

In addition (or in the alternative) to training a design-component-neural network, in some embodiments, the design-component-validation system applies the design-component-neural network to categorize design components as platform widgets corresponding to particular computing platforms. As suggested above, in certain implementations, the design-component-validation system provides an interface-design file containing a design component to a design-component-neural network. The design-component-validation system then generates a design-feature indicator for the design component utilizing the object-recognition layers. The design-component-validation system subsequently categorizes the design component as a platform widget corresponding to a computing platform based on the design-feature indicator for the design component and indicators from the platform-component-recognition layers.

As suggested above, in addition to categorizing a design component as a platform widget, the disclosed design-component-validation system can further determine whether the design component complies with a user-interface guideline for the platform widget. For example, in some cases, the design-component-validation system determines that the design component complies with (or diverges from) a standardized-user-interface guideline for the platform widget corresponding to a computing platform. Similarly, in some cases, the design-component-validation system determines that the design component complies with (or diverges from) a customized-user-interface guideline for the platform widget corresponding to a customized-interface-guideline file (e.g., a user-interface guideline customized by a user of the design-component-validation system).

When determining whether a design component complies with a user-interface guideline, the design-component-validation system optionally analyzes graphic nodes within an interface-design file and identifies a graphic node corresponding to the design component. For example, in some embodiments, upon identifying a graphic node corresponding to the design component, the design-component-validation system identifies nodal properties of the graphic node and compares the nodal properties to corresponding properties of user-interface guidelines for a platform widget. The design-component-validation system may perform a similar comparison for each design component and their one or more corresponding graphic nodes within an interface-design file. From this comparison, the design-component-validation system may determine that a nodal property of a graphic node corresponding to the design component complies with (or diverges from) a user-interface guideline for the platform widget.

As further suggested above, in addition to determining whether a design component complies with user-interface guidelines, in certain embodiments, the design-component-validation system provides a client device with indicators of such compliance and (under some circumstances) provides options to modify non-compliant design components. For instance, in response to determining that a design component complies with or diverges from a user-interface guideline, in some instances, the design-component-validation system respectively presents the following indicators within a user interface of a client device: (i) a compliance indication that the design component complies with the user-interface guideline for a platform widget or (ii) a non-compliance indication that the design component does not comply with the user-interface guideline for the platform widget.

In addition to providing a non-compliance indication, in certain embodiments, the design-component-validation system further presents (within a user interface) a selectable option to modify the design component to comply with the user-interface guideline for the platform widget. Upon detecting a selection of the selectable option, the design-component-validation system can modify the design component within a corresponding interface-design file to generate an adjusted design component in compliance with the user-interface guideline for the platform widget. In some such cases, the design-component-validation system further renders a modified user interface corresponding to the interface-design file comprising the adjusted design component.

The disclosed design-component-validation system overcomes several technical deficiencies that hinder conventional interface-design systems. First, the design-component-validation system improves upon existing interface-design systems by automatically identifying a type of platform widget for a design component within an interface-design file. While existing interface-design systems can create design components, they lack the computing capability to automatically categorize such design components for a user. Further to the point, existing interface-design systems provide users with little to no guidance on how to create a design component for a particular computing platform. By contrast, the disclosed design-component-validation system uses a unique neural network with new categorizing functionalities—that is, the disclosed design-component-neural network. The design-component-neural network includes a novel architecture that facilitates such categorization. In some embodiments, for instance, the design-component-neural network includes object-recognition layers that generate design-feature indicators indicating object classifications for design components. In addition to such object classifications, the design-component-neural network may further include platform-component-recognition layers that indicate whether a design component corresponds to a platform widget for a particular computing platform.

Second, in some embodiments, the design-component-validation system not only categorizes design components but also accurately and efficiently determines whether design components comply with user-interface guidelines for a computing platform. The design-component-validation system determines such design-component compliance with an accuracy and efficiency unmatched by humans who previously adjusted design components for existing interface-design systems. As noted above, a designer and software developer who rely on existing interface-design systems may engage in time intensive and tedious back-and-forth exchanges to manually adjust design components to satisfy user-interface guidelines. By contrast, in some embodiments, the design-component-validation system can not only automatically categorize a design component, but can also employ a unique algorithm that compares graphic nodes corresponding to design components to related user-interface guidelines for a computing platform. By iteratively comparing nodal properties of graphic nodes corresponding to a design component to corresponding properties of user-interface guidelines, the design-component-validation system automates a comparison that humans previously performed, but with much more precession and in far less time than humans. With the introduction of the design-component-neural network, the design-component-validation system can perform such a comparison (graphic node by graphic node) based on an automated categorization from a novel neural network architecture.

Third, in certain embodiments, the design-component-validation system increases the flexibility and user efficiency of existing interface-design systems. For instance, in some cases, the design-component-validation system uses one or both of standardized-user-interface guidelines and customized-user-interface guidelines when determining whether a design component complies with a user-interface guideline. By contrast, existing interface-design systems neither determine such compliance nor implement customized-user-interface guidelines for a platform widget. Additionally, in contrast to existing interface-design systems, the design-component-validation system improves user efficiency by automatically modifying a design component in response to a selection of a selectable option for modification. Such a selectable option facilitates a one-touch workflow to reconfigure a non-compliant design component. Finally, the design-component-validation system improves the flexibility of existing interface-design systems by introducing a design-component-neural network comprising platform-component-recognition layers that can be added to, subtracted from, or replaced. By employing a design-component-neural network with platform-component-recognition layers that can be modified, the design-component-validation system presents a neural network that may be trained to categorize design components as platform widgets corresponding to a flexible collection of computing platforms.

The design-component-validation system provides several additional advantages over conventional systems. For example, the design-component-validation system is more efficient. In particular, the design-component-validation system employs a more efficient model/structure. For example, by using a neural network having a plurality of platform specific platform component recognition layers to process the feature indicator provided by a single neural network encoder, the design-component-validation system can analyze a design file to determine whether it corresponds to a plurality of platforms simultaneously. Consequently, the design-component-validation system avoids the excessive amounts of time and analytical iterations that would be required for separate neural networks for each platform.

Further, the design-component-validation system is more accurate than conventional systems. In particular, because the design-component-validation system jointly trains the platform-component-recognition layers, the design-component-validation system is able to classify widgets from different platforms more accurately as the training is holistic. Additionally, because of its improved accuracy, the design-component-validation system avoids wasting valuable computer processing resources.

Turning now to FIG. 1, this figure depicts a design-component-validation system 104 categorizing design components 102*a*-102*c* from an interface-design file and validating the design components 102*a*-102*c* against user-interface guidelines for a computing platform. In general, and as depicted in FIG. 1, the design-component-validation system 104 uses a design-component-neural network 106 to categorize the design components 102*a*-102*c* as platform widgets corresponding to a particular computing platform. The design-component-validation system 104 further uses an interface-guideline validator 112 to determine whether the design components 102a-102c comply with or diverge from user-interface guidelines for the platform widgets. Upon making the compliance determinations, the design-component-validation system 104 presents the following elements within a user interface of a client device: compliance indications 114a and 114b, a non-compliance indication 116, and selectable options 118a and 118b to modify or decline modification of the design component 102b to comply with a user-interface guideline for a platform widget.

As indicated by FIG. 1, the design-component-validation system identifies (or detects a selection of) an interface-design file comprising a user interface 100 with the design components 102a-102c. As used in this disclosure, the term "interface-design file" refers to a digital-data file comprising one or more design components for a user interface. For example, in some embodiments, an interface-design file may be a digital-data file comprising a digital image of a user interface and graphic nodes of one or more design components. An interface-design file may come in a variety of file formats, including, but not limited to, .JPG, .GIF, .PNG, .SVG, .PSD, .TIFF, and .XD file formats. As indicated by FIG. 1, the design components 102a-102c for the user interface 100a are part of an interface-design file.

Relatedly, the term "design component" refers to a visual object designed for a user interface. In some embodiments, for example, a design component may be a control element, field, icon, image, or other visible object designed for display within a user interface. Such design components may include, but are not limited to, application bars, backdrops, banners, bottom navigations, buttons, cards, chips, data tables, dialogs, dividers, image lists, labels, lists, menus, navigation drawers, page controls, pickers, progress indicators, refresh content controls, segmented controls, selection controls, steppers, sheets, sliders, snackbars, switches, tabs, text fields, or tooltips. As shown in FIG. 1, for instance, the design components 102a and 102b represent floating buttons and the design component 102c represents a text field.

After identifying the interface-design file, the design-component-validation system 104 provides the interface-design file containing the design components 102a-102c to the design-component-neural network 106. As used in this disclosure, the term "design-component-neural network" refers to an artificial neural network that generates indicators that design components correspond to platform widgets for particular computing platforms. In certain implementations, a design-component-neural network includes a convolutional neural network ("CNN") that comprises one or more object-recognition layers and one or more platform-component-recognition layers. While a design-component-neural network may comprise a CNN, in some embodiments, a design-component-neural network may alternatively comprise various types of feedforward artificial neural networks comprising an input layer, hidden layers, and an output layer. For illustrative purposes, the design-component-neural network 106 shown in FIG. 1 comprises a CNN that includes object-recognition layers 108 and platform-component-recognition layers 110.

As used herein, the term "object-recognition layer" refers to a layer within a neural network that (together with other neural-network layers) generate features indicating object classifications for design components. For instance, in some embodiments, object-recognition layers receive a design component and output design-features that can indicate general object classifications for the design component. In some cases, object-recognition layers represents hidden layers of a design-component-neural network. As suggested above, object-recognition layers may take the form of, but are not limited to, an Inception module or a residual neural network that generates design-features indicators for a design component. But other neural-network components may be used, such as a DenseNet or SparseNet.

The term "design-feature indicator" refers to a representation of features that object-recognition layers generate for a design component. For instance, in some embodiments, a design-feature indicator is an array, vector, matrix, or map of the features a design component. Such an array, vector, matrix, or map may indicate contents, borders, icons, or shapes of a design component or may indicate latent or hidden features.

After the object-recognition layers 108 generate design-feature indicators for each of the design components 102a-102c, the design-component-validation system 104 provides the design-feature indicators to the platform-component-recognition layers 110. The term "platform-component-recognition layer" refers to a layer within a neural network that indicates whether a design component corresponds to a platform widget for a particular computing platform. For instance, in some embodiments, a platform-component-recognition layer receives design-feature indicators from object-recognition layers as inputs and outputs a probability indicator that a design component corresponds to a platform widget for a computing platform.

As suggested above, a platform-component-recognition layer may take the form of, but is not limited to, a softmax layer that generates probability indicators. Accordingly, in certain embodiments, a platform-component-recognition layer generates a probability indicator between zero and one that a design component corresponds to a platform widget for a particular computing platform.

As just suggested, after receiving as inputs the design-feature indicators for the design components 102a-102c, each of the platform-component-recognition layers 110 generate an indicator of a platform widget corresponding to a particular computing platform. Based on the training indicators of platform widgets, the design-component-validation system 104 categorizes each of the design components 102a-102c as platform widgets corresponding to particular computing platforms. In FIG. 1, for instance, the design-component-validation system 104 categorized the design components 102a and 102b as floating buttons for a computing platform and the design component 102c as a text field for the same computing platform.

As used in this disclosure, the term "platform widget" refers to a design component for a particular computing platform. Accordingly, a platform widget may take the form of any design component described above for a particular computing platform. In some embodiments, a platform widget refers to a control element, field, icon, image, or other visible object designed for display within a user interface for a particular computing platform.

The term "computing platform" refers to a technological environment for which software components and applications are developed and within which computing devices operate software components and applications. For example, a computing platform may use a specific software language or machine language code and also run a type of software or suite of compatible software applications based on an operating system. In certain embodiments, for instance, a particular computing platform may be or comprise an Android, Linux, Mac Operating System ("Mac OS"), Internet Operating System ("iOS"), or Windows computing platform, among many other possible computing platforms. A computing platform may likewise correspond to specific user-interface guidelines for design components within the computing platform.

As further indicated by FIG. 1, the design-component-validation system 104 uses the interface-guideline validator 112 to determine whether the design components 102a-102c comply with (or diverge from) user-interface guidelines for their respective platform widgets. As used herein, the term "user-interface guideline" refers to a set of parameters or requirements for one or more platform widgets corresponding to a particular computing platform. In certain embodiments, a user-interface guideline includes a technical specification defining parameters for a particular platform widget corresponding to a computing platform. For instance, a user-interface guideline may define bitmaps, gradients, shadowing, shapes, sizes, or other technical parameters for a platform widget. While a platform widget may correspond to multiple user-interface guidelines, a given computing platform may likewise use multiple platform widgets each corresponding to multiple user-interface guidelines.

As indicated above, a user-interface guideline may be a standard-user-interface guideline for a platform widget comprising a guideline prescribed by a designer, owner, or provider of a computing platform. Additionally, or alternatively, a user-interface guideline may be a customized-user-interface guideline for a platform widget adjusted or defined by a user. In some embodiments, an interface-guideline file may comprise a set of user-interface guidelines. For instance, a standard-interface-guideline file or customized-interface-guideline file may comprise user-interface guidelines for multiple design components corresponding to a particular computing platform in a variety of formats, such as a .BSON, .JSON, or .YAML file.

When determining compliance for the design components 102a-102c, the design-component-validation system 104 iteratively identifies nodal properties of graphic nodes corresponding to the design components 102a-102c and compares the nodal properties to corresponding properties of user-interface guidelines for their respective platform widgets. As indicated by FIG. 1, from this comparison, the design-component-validation system 104 determines that the design components 102a and 102c comply with user-interface guidelines for their respective platform widgets, but that the design component 102b does not comply with user-interface guidelines for its respective platform widget.

As further shown in FIG. 1, based on these compliance determinations, the design-component-validation system 104 presents compliance indications within a user interface of a client device associated with a user. In particular, the design-component-validation system 104 presents compliance indications 114a and 114b that the design components 102a and 102c comply with user-interface guidelines for their respective platform widgets. By contrast, the design-component-validation system 104 presents a non-compliance indication 116 that the design component 102b does not comply with user-interface guidelines for its respective platform widget.

As suggested above, in addition to these compliance indications, the design-component-validation system 104 further presents within the user interface a selectable option 118a to modify the design component 102b to comply with a particular user-interface guideline for the platform widget. Conversely, the design-component-validation system 104 presents with the user interface a selectable option 118b to decline modifying the design component 102b to comply with the user-interface guideline. This disclosure describes the modification process in response to options such as the selectable option 118a further below.

Figure 2A:
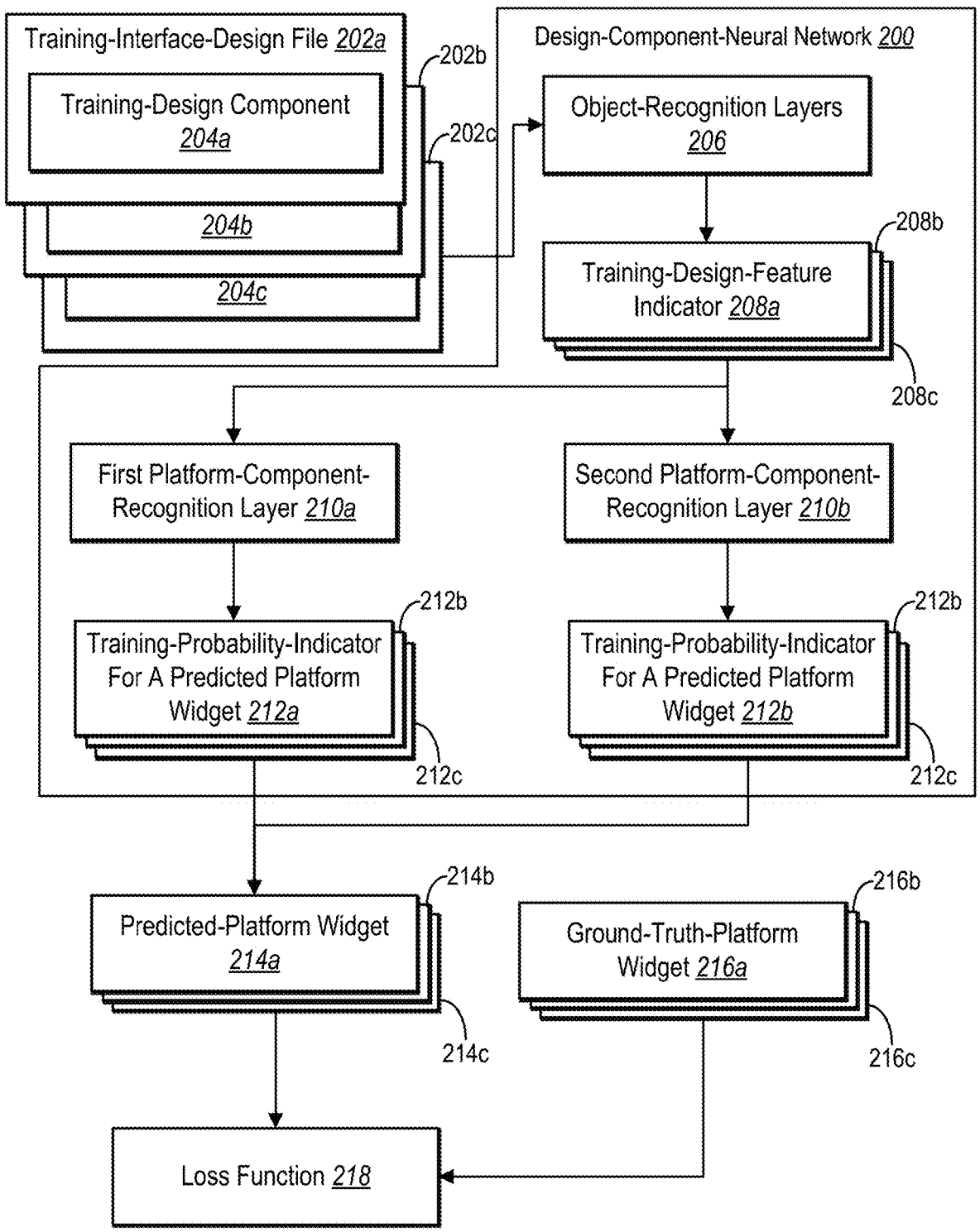
FIG. 2A illustrates the design-component-validation system training a design-component-neural network to categorize design components as platform widgets corresponding to particular computing platforms in accordance with one or more embodiments.

As indicated above, the design-component-validation system 104 may train or apply a design-component-neural network. FIG. 2A illustrates the design-component-validation system 104 training a design-component-neural network to categorize design components as platform widgets corresponding to particular computing platforms. As shown in FIG. 2A, the design-component-validation system 104 iteratively provides training-interface-design files 202a-202c containing training-design components 204a-204c to a design-component-neural network 200. During each training iteration, the design-component-validation system 104 categorizes a training-design component as a predicted-platform widget based on a training-design-feature indicator from object-recognition layers and training-probability indicators for different predicted-platform widgets from platform-component-recognition layers.

The design-component-validation system 104 subsequently determines a loss from a loss function 218 based on a comparison of the predicted-platform widget with a ground-truth-platform widget for a ground-truth-computing platform. Based on the determined loss, the design-component-validation system 104 adjusts network parameters for the various layers within the design-component-neural network 200 to reduce a loss in a subsequent training iteration. For illustrative purposes, the following paragraphs describe a training iteration for the training-interface-design file 202a. As used below and in this disclosure, the terms "training-interface-design file," "training-design-feature indicator," and "predicted-platform widget" refer to an interface-design file, a design-feature indicator, and a platform widget, respectively, used for training a design-component-neural network.

As suggested above, the design-component-validation system 104 provides the training-interface-design file 202a containing a training-design component 204a to the design-component-neural network 200. After receipt, the design-component-neural network 200 optionally provides the training-design component 204a to the object-recognition layers 206. As further indicated in FIG. 2A, the object-recognition layers 206 generate a training-design-feature indicator 208a for the training-design component 204a. Consistent with the disclosure above, the training-design-feature indicator 208a includes features for the training-design component 204a.

After generating the training-design-feature indicator 208a, the design-component-validation system 104 provides the training-design-feature indicator 208a to both a first platform-component-recognition layer 210a and a second platform-component-recognition layer 210b. The design-component-neural network 200 accordingly includes two independent types of layers—the object-recognition layers 206, on the one hand, and the first and second platform-component-recognition layers 210a and 210b, on the other hand. The object-recognition layers 206 are independent of a particular computing platform and detect general design features of a training-design component. By contrast, the first platform-component-recognition layer 210a and the second platform-component-recognition layer 210b respectively correspond to (and are specifically tuned for) different computing platforms.

Because the design-component-neural network 200 can include such independent types of layers, in certain embodiments, the design-component-validation system 104 can add, replace, or subtract platform-component-recognition layers to or from the design-component-neural network 200.

For example, the design-component-validation system 104 may add (or replace the second platform-component-recognition layer 210b with) a third platform-component-recognition layer (not shown) corresponding to a computing platform that differs from those computing platforms that correspond to the first and second platform-component-recognition layers 210a and 210b. For explanatory purposes, however, this disclosure primarily describes the first and second platform-component-recognition layers 210a and 210b with the understanding that additional platform-component-recognition layers would function similarly. Thus, while FIG. 2A illustrates first and second platform-component recognition layers, other implementations can include any number of platform-component recognition layers corresponding to various platforms.

Based on the training-design-feature indicator 208a, the first platform-component-recognition layer 210a generates a training-probability indicator 212a that the training-design component 204a corresponds to a first predicted-platform widget for a first computing platform. Similarly, based on the training-design-feature indicator 208a, the second platform-component-recognition layer 210b generates a training-probability indicator 212b that the training-design component 204a corresponds to a second predicted-platform widget for a second computing platform.

As just suggested, the training-probability indicator 212a and the training-probability indicator 212b indicate probabilities for different predicted-platform widgets that each correspond to different computing platforms. As used in this disclosure, the term "probability indicator" refers to a measure or quantification of probability that a design component corresponds to a particular platform widget. The term "training-probability indicator" refers to a probability indicator generated by a platform-component-recognition layer during training of a design-component-neural network. A probability indicator, for instance, may refer to a numerical probability that design-feature indicators for a design component correspond to a particular platform widget. In some such embodiments, a probability indicator comprises a value between zero and one (or some other numerical range) that a design component corresponds to a platform widget for a particular computing platform.

As further shown in FIG. 2A, based on the training-probability indicators 212a and 212b, the design-component-validation system 104 categorizes the training-design component 204a as a predicted-platform widget 214a corresponding to a particular computing platform. For instance, in some embodiments, the design-component-validation system 104 determines that the training-probability indicator 212a indicates a higher probability that the training-design component 204a corresponds to the widget on the first platform than to a widget on the second platform. Based on determining that the training-probability indicator 212a indicates a higher probability that the training-design component 204a corresponds to the first predicted-platform widget, the design-component-validation system 104 categorizes the training-design component 204a as the first predicted-platform widget for the first computing platform. According, in this particular example, the first predicted-platform widget constitutes the predicted-platform widget 214a shown in FIG. 2A. In additional embodiments, however, the design-component-validation system 104 selects a different predicted-platform widget based on training-probability indicators.

After categorizing the training-design component 204a as the predicted-platform widget 214a, the design-component-validation system 104 determines a loss from the loss function 218 based on a comparison of the predicted-platform widget 214a with a ground-truth-platform widget 216a for a ground-truth-computing platform. As used in this disclosure, the term "ground-truth-platform widget" refers to an empirically observed (or human identified) platform widget corresponding to a training-design component that is used as a reference to train platform-component-recognition layers or a design-component-neural network generally. Similarly, the term "ground-truth-computing platform" refers to an empirically observed (or human identified) computing platform corresponding to a training-design component that is used as a reference to train platform-component-recognition layers or a design-component-neural network generally. A ground-truth-platform widget and a ground-truth-computing platform thus function as references for the design-component-validation system 104 to determine whether it accurately identifies a predicted-platform widget corresponding to a computing platform.

When determining a loss from the loss function 218, the design-component-validation system 104 may use a variety of loss functions. For instance, in certain embodiments, the design-component-validation system 104 determines a loss using a cross-entropy-loss function, an average-binary-cross-entropy-loss function, loss for a positive regressor, or a mean-squared-error function. But the design-component-validation system 104 can use any suitable loss function, including, but not limited to, cosine-proximity-loss function, Kullback-Leibler divergence, a hinge-loss function, L1-norm-loss function, L2-norm-loss function, a mean-absolute-error-loss function, a mean-absolute-percentage-error-loss function, a mean-squared-logarithmic-error-loss function, a negative-logarithmic-likelihood-loss function, a Poisson-loss function, or a squared-hinge-loss function.

Based on the determined loss, the design-component-validation system 104 adjusts network parameters (e.g., weights or values) in one or more of the object-recognition layers 206, the first platform-component-recognition layer 210a, or the second platform-component-recognition layer 210b. The design-component-validation system 104 adjusts network parameters in one or more of the various layers within the design-component-neural network 200 to reduce a loss determined in a subsequent training iteration. For example, in some embodiments, the design-component-validation system 104 increases or decreases weights or values for the object-recognition layer 206 to reduce a loss determined in a subsequent training iteration. Similarly, in some embodiments, the design-component-validation system 104 increases or decreases weights or values for one or both of the first platform-component-recognition layer 210a and the second platform-component-recognition layer 210b to reduce a loss determined in a subsequent training iteration.

After adjusting network parameters for one or more layers within the design-component-neural network 200, in certain implementations, the design-component-validation system 104 performs additional training iterations. For instance, upon providing the training-interface-design file 202b to the design-component-neural network 200, the design-component-validation system 104 generates a training-design-feature indicator 208b for a training-design component 204b (from the training-interface-design file 202b) using the object-recognition layers 206. The design-component-validation system 104 further categorizes the training-design component 204b as a predicted-platform widget 214b based on the training-design-feature indicator 208b from the object-recognition layers 206 and training-probability indicators 212c and 212d for different predicted-platform widgets from the first platform-component-recognition layer 210a and the second platform-component-recognition layer 210b, respectively. The design-component-validation system 104 subsequently adjusts network parameters within one or more layers of the design-component-neural network 200 based on a loss determined from the loss function 218 by comparing the predicted-platform widget 214b and a ground-truth-platform widget 216a for a ground-truth-computing platform.

Similarly, in a subsequent training iteration, the design-component-validation system 104 uses the layers of the design-component-neural network 200 to generate a training-design-feature indicator 208a and training-probability indicators 212e and 212f for a training-design component 204c from the training-interface-design file 202c. Based on the training-probability indicators 212e and 212f, the design-component-validation system 104 categorizes the training-design component 204c as a predicted-platform widget 214a and adjusts network parameters based on a loss from the loss function 218 comparing the predicted-platform widget 214c to the ground-truth-platform widget 216c. In certain implementations, the design-component-validation system 104 continues to perform such training iterations until satisfying a convergence criteria. For instance, in some cases, the design-component-validation system 104 performs training iterations until the value or weights for the layers from the design-component-neural network 200 do not change significantly across training iterations.

As noted above, the design-component-neural network 200 comprises object-recognition layers 206 that are independent from the first and second platform-component-recognition layers 210a and 210b. Accordingly, in certain embodiments, the design-component-validation system 104 can replace the object-recognition layers 206 with different types of neural-network layers for training. For instance, if an Inception module constituted the object-recognition layers 206, the design-component-validation system 104 optionally replaces the Inception module with a residual neural network and trains (or tunes) the residual neural network as object-recognition layers for the design-component-neural network 200. Conversely, if a residual neural network constituted the object-recognition layers 206, the design-component-validation system 104 optionally replaces the residual neural network with an Inception module and trains (or tunes) the Inception module as object-recognition layers for the design-component-neural network 200. While this disclosure uses an Inception module and a residual neural network as example, other neural network layers may be used and replaced as object-recognition layers (e.g., a Dense Convolutional Network ("DenseNet") or a Sparse DenseNet ("SparseNet")).

In addition (or in the alternative) to training the object-recognition layers 206 together with platform-component-recognition layers, in some embodiments, the design-component-validation system 104 independently trains the object-recognition layers. In still furthermore embodiments, the object-recognition layers can comprise a pre-trained encoder that is further trained during training of the platform-component-recognition layers.

Figure 2B:
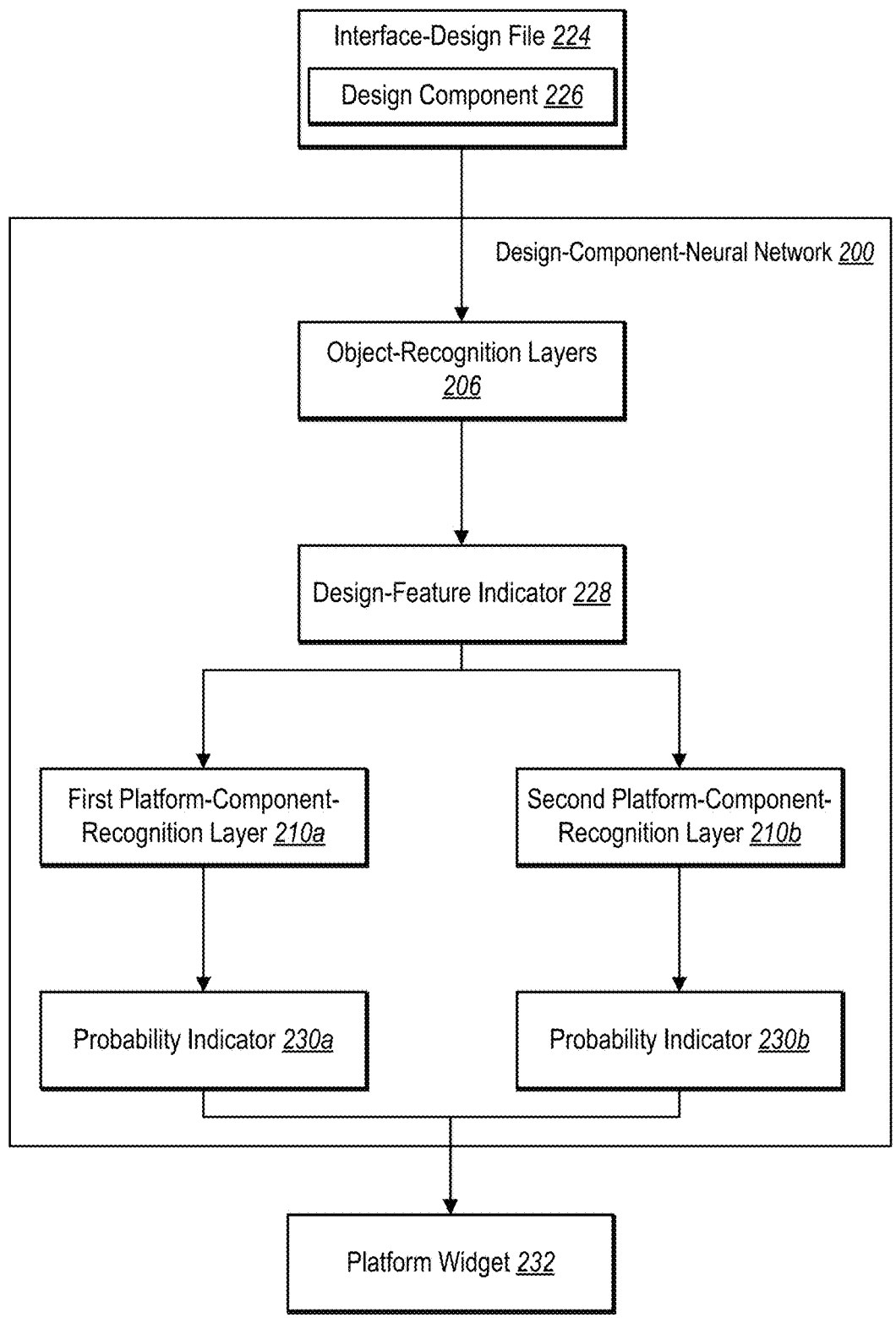
FIG. 2B illustrates the design-component-validation system applying a design-component-neural network to categorize a design component as a platform widget corresponding to a particular computing platform in accordance with one or more embodiments.

In addition (or in the alternative) to training the design-component-neural network 200, in certain embodiments, the design-component-validation system 104 applies the design-component-neural network 200. FIG. 2B illustrates one such application. In general FIG. 2B illustrates the design-component-validation system 104 applying the design-component-neural network 200 to categorize a design component 226 as a platform widget 232 corresponding to a particular computing platform. For explanatory purposes, FIG. 2B illustrates the design-component-validation system 104 using the design-component-neural network 200 to accurately categorize a single design component as a platform widget. As the training description above suggests, however, the design-component-neural network 200 can be used to categorize different types of design components as different types of platform widgets corresponding to particular computing platforms.

As shown in FIG. 2B, the design-component-validation system 104 provides an interface-design file 224 containing a design component 226 for a user interface to the design-component-neural network 200. The design-component-neural network 200 subsequently provides design-component features of the design component 226 to the object-recognition layers 206. For instance, in some embodiments, the design-component-validation system 104 provides the design component 226 to an input layer (not shown) for the input layer to extract design-component features and feed them to the object-recognition layers 206. As further indicated in FIG. 2B, the object-recognition layers 206 generate a design-feature indicator 228 for the design component 226. Consistent with the disclosure above, the design-feature indicator 228 indicates an object classification for the design component 226.

After generating the design-feature indicator 228, the design-component-validation system 104 provides the design-feature indicator 228 to both the first platform-component-recognition layer 210a and the second platform-component-recognition layer 210b. Based on the design-feature indicator 228, the first platform-component-recognition layer 210a generates a probability indicator 230a that the design component 226 corresponds to a first platform widget for a first computing platform. Similarly, based on the design-feature indicator 228, the second platform-component-recognition layer 210b generates a probability indicator 230b that the design component 226 correspond to a second platform widget for a second computing platform.

As further shown in FIG. 2B, based on the probability indicators 230a and 230b, the design-component-validation system 104 categorizes the design component 226 as a platform widget 232 corresponding to a particular computing platform. For instance, in some embodiments, the design-component-validation system 104 determines that the probability indicator 230a indicates a higher probability that the design component 226 corresponds to a first platform widget than to a second platform widget. Based on determining that the probability indicator 230a indicates a higher probability that the design component 226 corresponds to the first platform widget, the design-component-validation system 104 categorizes the design component 226 as the first platform widget for the first computing platform. According, in this example, the first platform constitutes the platform widget 232.

As suggested above, in some embodiments, the first and second platform-component-recognition layers 210a and 210b each comprise softmax layers. Accordingly, in certain implementations of training or applying the design-component-neural network 200, the first and second platform-component-recognition layers 210a and 210b each solve a softmax function. For instance, based on a design-feature vector from the object-recognition layers 206, the first platform-component-recognition layer 210a solves a softmax function to generate a first probability indicator of a value between zero and one indicating that a design component corresponds to a first platform widget for a first computing platform. Similarly, based on a design-feature vector from the object-recognition layers 206, the second platform-component-recognition layer 210b solves a softmax function to generate a second probability indicator of a value between zero and one indicating that a design component corresponds to a second platform widget for a second computing platform. Accordingly, the design-component-validation system 104 optionally selects between the higher of the first probability indicator and the second probability indicator values to categorize the design component.

Figure 3A:
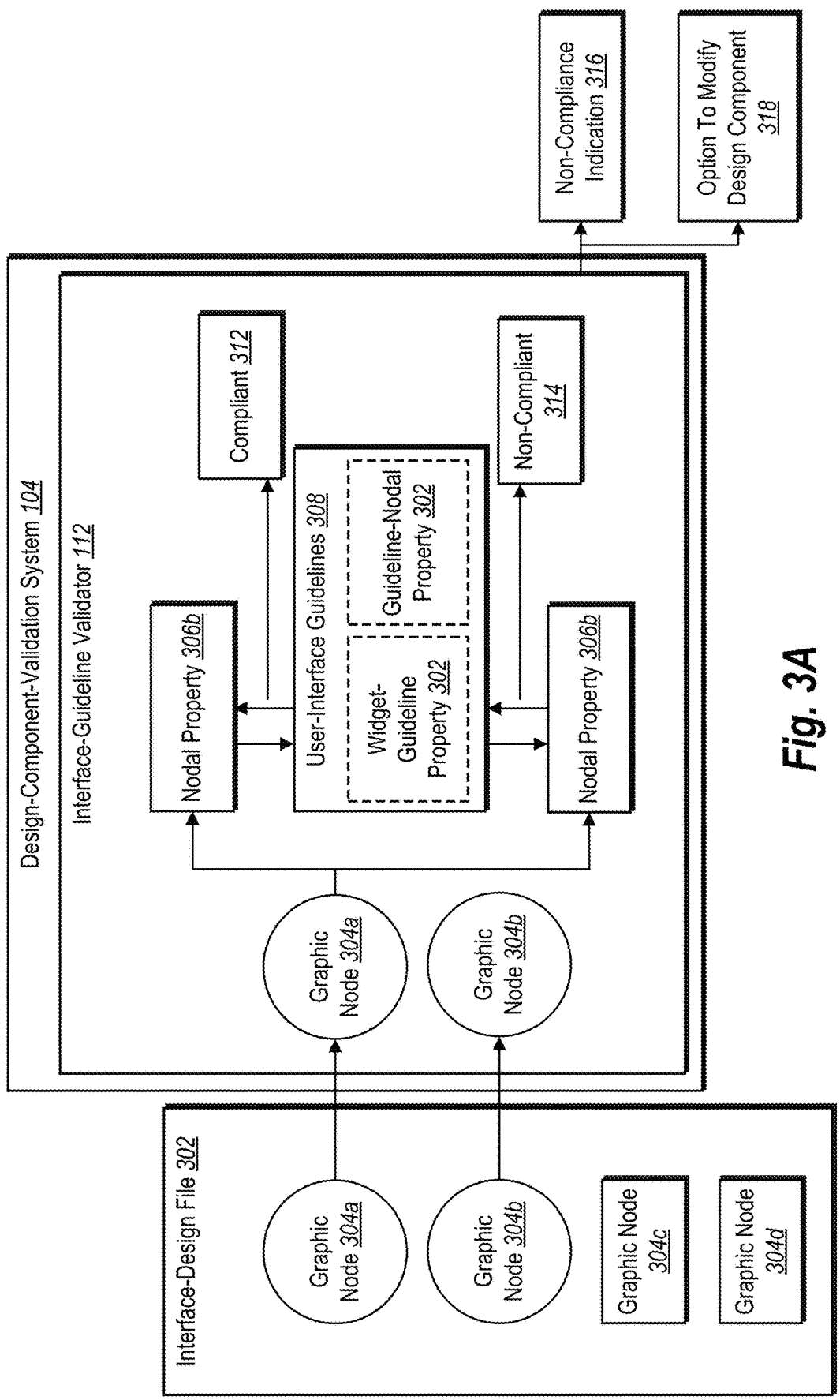
FIG. 3A illustrates the design-component-validation system determining that properties of a design component comply with or diverge from user-interface guidelines for a platform widget in accordance with one or more embodiments.

In addition to categorizing design components as platform widgets, in some embodiments, the design-component-validation system 104 also compares and validates properties of a design component against user-interface guidelines for a particular computing platform. FIG. 3A provides one such example of validating a design component. As indicated by FIG. 3A, the design-component-validation system 104 filters graphic nodes from an interface-design file to identify a graphic node corresponding to a design component that has been categorized as a platform widget. Upon identifying the graphic node corresponding to the design component, the design-component-validation system 104 compares the nodal properties of the graphic node with widget-guideline properties from user-interface guidelines for the corresponding platform widget. Based on the comparison, the design-component-validation system 104 determines that certain nodal properties comply with, or diverge from, widget-guideline properties from user-interface guidelines for the corresponding platform widget.

As suggested by FIG. 3A, the design-component-validation system 104 uses the interface-guideline validator 112 to iteratively identify graphic nodes corresponding to categorized design components and to compare nodal properties of each such graphic node to corresponding widget-guideline properties. For explanatory purposes, however, FIG. 3A depicts the interface-guideline validator 112 comparing and validating a single graphic node corresponding to a single design component—that is, a graphic node 304a. A skilled artisan will understand that, in some embodiments, the design-component-validation system 104 uses the interface-guideline validator 112 to likewise compare and validate additional graphic nodes corresponding to additional design components against user-interface guidelines. While the design-component-validation system 104 optionally uses the interface-guideline validator 112 to perform the actions depicted in FIG. 3A, the description below primarily refers to the design-component-validation system 104 as performing those actions.

As indicated by FIG. 3A, the design-component-validation system 104 filters graphic nodes 304a-304d within an interface-design file 302 to select graphic nodes corresponding to design components that have been categorized as platform widgets. For instance, in certain embodiments, the design-component-validation system 104 selects graphic nodes corresponding to design-feature indicators extracted by a design-component-neural network. In some embodiments, the design-component-validation system 104 further removes (or filters out) graphic nodes that do not correspond to a categorized design component. As shown in FIG. 3A, based on the filtering, the design-component-validation system 104 selects the graphic nodes 304a and 304b as corresponding to design components categorized as platform widgets.

As used in this disclosure, the term "graphic node" refers to a graphical or visual representation of a portion of a design component or of a design component itself. For example, in some embodiments, a graphic node refers to a set of pixels within a canvas of an interface-design file that represent a design component or a portion of a design component. Additionally, while FIG. 3A illustrates circular graphic nodes, the graphical nodes can be various shapes, styles, sizes, etc.

As suggested above, a graphic node comprises or corresponds to one or more nodal properties. The term "nodal property" refers to a graphical or visual characteristic of a graphic node. For example, nodal properties may include, but are not limited to, a type of background, distance from a canvas's edges, enclosed shape, height, layout bounds, shadow, shape, position, and width of a graphic node. The term "canvas" refers to a digital artboard or digital-design surface for visual elements of a digital document. In particular, a canvas may include a digital artboard or digital design-surface for a user interface upon or within which graphic nodes corresponding to design components are created or rendered.

As just noted, a graphic node may comprise or correspond to multiple nodal properties. As shown in FIG. 3A, for example, after selecting the graphic node 304a, the design-component-validation system 104 identifies nodal properties 306a and 306b of the graphic node 304a. For example, the design-component-validation system 104 may identify a shape as the nodal property 306a of the graphic node 304a and a shadowing property as the nodal property 306b of the graphic node 304a. As indicated here, however, the foregoing example for the nodal properties 306a and 306b are merely illustrative. The graphic node 304a may have any number or any type of nodal property.

As further shown in FIG. 3A, in addition to identifying the nodal properties 306a and 306b of the graphic node 304a, the design-component-validation system 104 identifies user-interface guidelines 308 for a platform widget as to which the design component corresponding to the graphic node 304a has been categorized. For example, in some embodiments, the design-component-validation system 104 parses an interface-guideline file (not shown) and extracts the user-interface guidelines 308 for a platform widget as to which the relevant design component corresponding to the graphic node 304a has been categorized. Consistent with the disclosure above, the design-component-validation system 104 may parse a standard-interface-guideline file or a customized-interface-guideline file comprising user-interface guidelines.

As noted above, in some embodiments, the design-component-validation system 104 parses a customized-interface-guideline file provided by a user to identify customized-user-interface guidelines for a platform widget. Table 1 below shows an example of one such customized-interface-guideline file in .JSON format comprising customized-user-interface guidelines for a floating button.

TABLE 1

```
{
    "Component": [
        {
            "type": "Floating Button",
            "object": {
                "shadow": true,
                "isCircular": true,
                "min distance from edge": 16,
                "min size": 101,
                "max size": 101,
                "innerNodeBitmap": true,
                "innerNodeBitmapSize": 24,
                "validation": true
            },
```

TABLE 1-continued

```
{
    "type": "seekBar",
    "object": {
        ...
    }
}
]
}
```

As further indicated by FIG. 3A, in some embodiments, user-interface guidelines include widget-guideline properties. As used in this disclosure, the term "widget-guideline property" refers to a characteristic of a platform widget defined by, recommended by, or contained within a user-interface guideline. A widget-guideline property may correspond to a nodal property. Accordingly, widget-guideline properties may include, but are not limited to, characteristics of a platform widget defined by a user-interface guideline specifying a type of background, distance from a canvas's edges, enclosed shape, height, layout bounds, shadow, shape, position, and width of the platform widget. In Table 1 above, for instance, the customized-user-interface guidelines for a floating button include widget-guideline properties for a shadow, shape, distance from a canvas's edge, minimum size, maximum size, inner bitmap, and innerbitmap size.

As shown in FIG. 3A, the user-interface guidelines 308 optionally comprise widget-guideline properties 310a and 310b identified by the design-component-validation system 104 while parsing the interface-guideline file. Here, the widget-guideline properties 310a and 310b correspond to the nodal properties 306a and 306b.

As further shown in FIG. 3A, the design-component-validation system 104 compares the nodal properties 306a and 306b of the graphic node 304a to the user-interface guidelines 308. In particular, in some embodiments, the design-component-validation system 104 compares (i) the nodal property 306a to the widget-guideline property 310a and (ii) the nodal property 306b to the widget-guideline property 310b. As FIG. 3A suggests, in certain implementations, the design-component-validation system 104 performs a one-to-one comparison of a nodal property to a corresponding widget-guideline property to determine whether a given nodal property complies with a corresponding widget-guideline property within user-interface guidelines.

When comparing nodal properties to corresponding widget-guideline properties, in certain embodiments, the design-component-validation system 104 executes a comparison algorithm that maps nodal properties to corresponding widget-guideline properties of the platform widget. As shown in Table 2 below, in some embodiments, the design-component-validation system 104 may execute the following high-level algorithm for various nodal properties of a graphic node:

TABLE 2

For a shape-nodal property: determine if a graphic node is a rectangular graphic node or an elliptical graphic node. For a rectangular graphic node, determine whether the shape-nodal property is either a rectangle or square to comply with a widget-guideline property for a corresponding platform widget. For an elliptical graphic node, determine whether the shape-nodal property is either an oval or circle to comply with a widget-guideline property for a corresponding platform widget.
For a background-fill-nodal property: determine whether a graphic node includes a solid fill, pattern fill, gradient fill, or bitmap fill. To determine compliance, map a solid fill to a color, a pattern fill to a repeated pattern, a gradient to a linear or a radial gradient, or a bitmap to an image fill per the widget-guideline properties for a corresponding platform widget with respect to the fill identified for the graphic node.
For a shadow-nodal property: determine whether a graphic node comprises a shadow-nodal property that either sets a shadow or sets no shadow to comply with a widget-guideline property for a corresponding platform widget.
For an edge-distance-nodal property: determine a distance of the graphic node from each edge of a canvas based on the size of the canvas, position, height, and width of the graphic node; and determine whether the distance of the graphic node from each edge falls within or complies with a distance range of a widget-guideline property for a corresponding platform widget.
For a height-nodal property: determine whether the height of the graphic node matches or falls within a range of height for a corresponding platform widget to comply with a widget-guideline property.
For a width-nodal property: determine whether the width of the graphic node matches or falls within a range of width for a corresponding platform widget to comply with a widget-guideline property.

The foregoing comparison algorithm is merely an example. The design-component-validation system 104 may execute a different comparison algorithm concerning different nodal properties or a more detailed comparison algorithm specific to a particular type of platform widget. When the design-component-validation system 104 categorizes a design component as a floating button, for instance, the design-component-validation system 104 may (additionally or alternatively) execute a comparison algorithm that identifies rectangular graphic nodes in a canvas and selects the rectangular graphic nodes as part of filtering; selects pairs of rectangular graphic nodes in which one rectangular graphic node encloses another rectangular graphic node; determines whether an outer rectangular graphic node of the pair includes a shadow-nodal property that sets a shadow to comply with a widget-guideline property for a floating button; determines whether the outer rectangular graphic node has a non-zero distance from the canvas's edges; and determines whether an inner rectangular graphic node of the pair is a bitmap or contains a bitmap as a background-fill-nodal property to comply with a widget-guideline property for a floating button.

As just suggested, when executing a comparison algorithm, the design-component-validation system 104 may further analyze the view bounds of each graphic node within an interface-design file to identify graphic nodes that enclose another graphic node. When the design-component-validation system 104 identifies a graphic node enclosing another graphic node, the design-component-validation system 104 optionally repeats preceding steps of a comparison algorithm for the enclosed graphic node.

As further shown in FIG. 3A, based on the comparison of the nodal properties 306a and 306b to the user-interface guidelines 308, the design-component-validation system 104 determines whether the nodal properties 306a and 306b comply with the user-interface guidelines 308. For example, based on the comparison for the nodal property 306a, the design-component-validation system 104 determines that the nodal property 306a is compliant 312 with the user-interface guidelines 308. By contrast, based on the comparison for the nodal property 306b, the design-component-validation system 104 determines that the nodal property 306b is non-compliant 314 with the user-interface guidelines 308. As suggested above, in some embodiments, for instance, the design-component-validation system 104 makes such compliance determinations based on a (i) the nodal property 306a with the widget-guideline property 310a and (ii) the nodal property with the widget-guideline property 310b.

After determining whether the graphic node 304a corresponding to a design component complies with the user-interface guidelines 308, in some embodiments, the design-component-validation system 104 determines compliance for graphic nodes corresponding to additional design components. Although not shown in FIG. 3A, in some cases, the design-component-validation system 104 further determines whether the graphic node 304b corresponding to an additional design component complies with use-interface guidelines for a platform widget as to which the additional design component has been categorized. Similar to the process described above, in certain implementations, the design-component-validation system 104 determines whether nodal properties of the graphic node 304b comply with widget-guideline properties of user-interface guidelines for the relevant platform widget.

In addition to determining compliance, the design-component-validation system 104 optionally presents compliance indications within a user interface of a client device associated with a user. As indicated by FIG. 3A, for example, the design-component-validation system 104 presents a non-compliance indication 316 that the design component corresponding to the graphic node 304a does not comply with the user-interface guidelines 308 for its respective platform widget. As suggested above, when the design-component-validation system 104 determines that all nodal properties comply with user-interface guidelines, in some cases, the design-component-validation system 104 presents a compliance indication that the design component corresponding to the graphic node complies with the user-interface guidelines for its respective platform widget. This disclosure describes further examples of compliance indications below with respect to FIGS. 4A-4F.

Figure 3B:
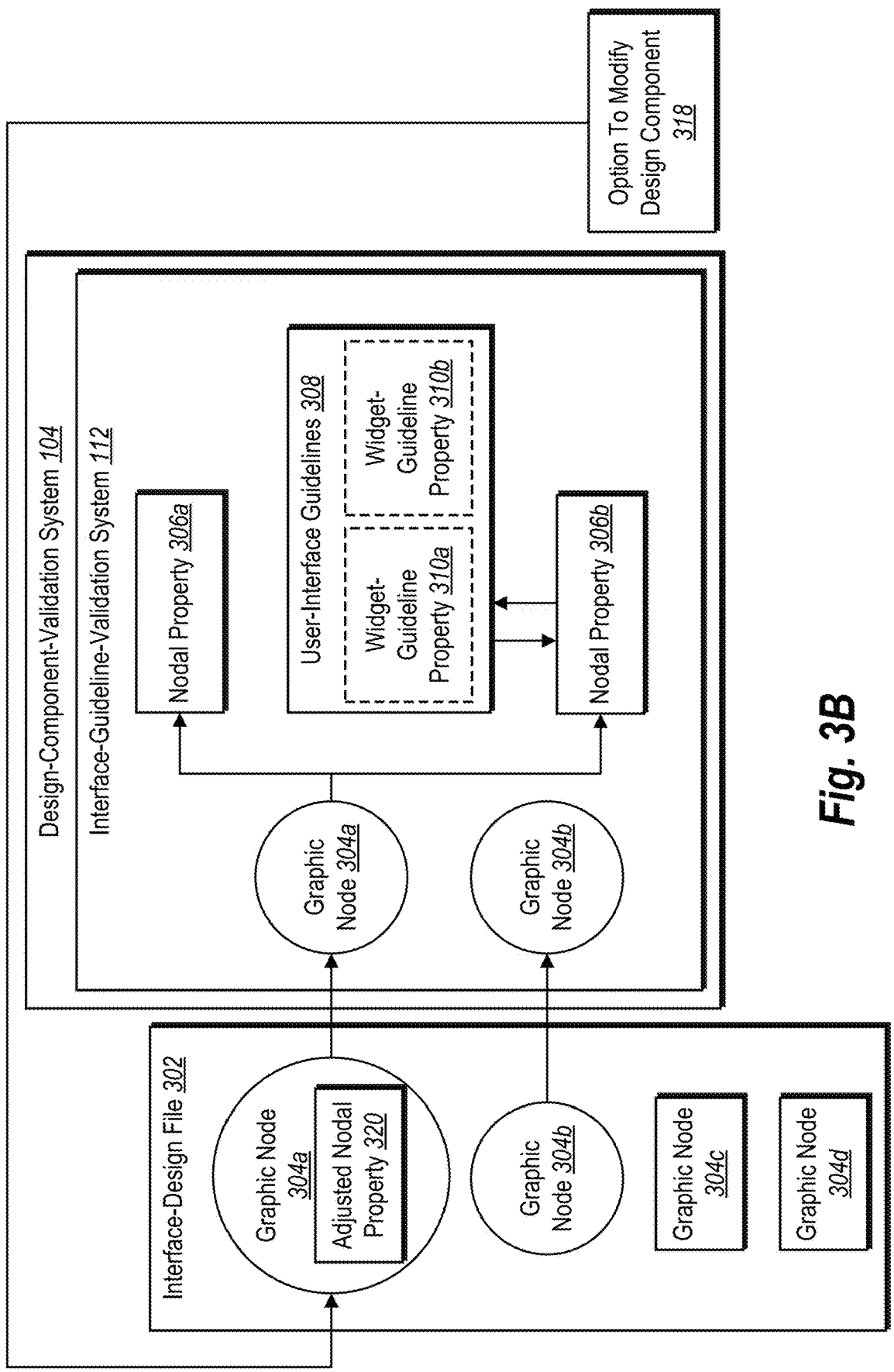
FIG. 3B illustrates the design-component-validation system modifying a design component to comply with a user-interface guideline for a platform widget based on determining that the design component does not comply with the user-interface guideline in accordance with one or more embodiments.

As further shown in FIG. 3A, in addition to presenting compliance indications, the design-component-validation system 104 presents within the user interface a selectable option 318 to modify the design component corresponding to the graphic node 304a to comply with one or more of the user-interface guidelines 308 for the platform widget. FIG. 3B depicts the actions of the design-component-validation system 104 in response to detecting a selection of the selectable option 318. In general, FIG. 3B illustrates an example of the design-component-validation system 104 modifying a design component to comply with a user-interface guideline for a platform widget based on determining that the design component does not comply with the user-interface guideline.

As shown in FIG. 3B, the design-component-validation system 104 identifies within the interface-design file 302 the graphic node 304a corresponding to the non-compliant design component. The design-component-validation system 104 subsequently modifies the nodal property 306b of the graphic node 304a to generate an adjusted nodal property 320 of the graphic node 304a in compliance with the user-interface guidelines 308. In some such embodiments, the design-component-validation system 104 modifies the nodal property 306b within the interface-design file 302 to match or otherwise comply with the widget-guideline property 310b. In certain implementations, the design-component-validation system 104 further renders on a client device a modified user interface corresponding to the interface-design file 302 comprising the adjusted nodal property 320 of the graphic node 304a. This disclosure describes an example of a modified user interface further below with respect to FIGS. 4A-4F.

When modifying a nodal property to comply with a user-interface guideline, the design-component-validation system 104 optionally modifies code or computer-executable instructions corresponding to the nodal property to match or reflect a corresponding widget-guideline property. For instance, the design-component-validation system 104 may modify code or computer-executable instructions to (i) change a shadow-nodal property from no shadow setting to a shadow setting (or true) to reflect a widget-guideline property for a corresponding platform widget; (ii) change an edge-distance-nodal property from zero (or some other insufficient distance value) to reflect a maximum, minimum, or set distance from an edge of a canvas per a widget-guideline property for a corresponding platform widget; or (iii) change a height-nodal property from an insufficient (or excessive) height value to a height value within a range of height (or to a set height) to comply with a widget-guideline property for a corresponding platform widget. The modifications (i)-(iii) are merely illustrative. The design-component-validation system 104 may modify any nodal property described above to comply with a corresponding widget-guideline property.

As noted above, in certain implementations, the design-component-validation system 104 provides a client device with compliance indications and options to select interface-guideline files or to modify a design component. FIGS. 4A-4F illustrates various graphical user interfaces of the design-component-validation system 104 presenting options to select interface-guideline files, a compliance indication and non-compliance indication for design components, and a selectable option to modify a design component to comply with a user-interface guideline in accordance with one or more embodiments.

FIGS. 4A-4F each depict a computing device 400 comprising an interface-design application for the design-component-validation system 104. The interface-design application comprises computer-executable instructions that cause the computing device 400 to perform certain actions depicted in FIGS. 4A-4F. Rather than repeatedly describe the computer-executable instructions within the interface-design application as causing the computing device 400 to perform such actions, this disclosure primarily describes the computing device 400 or the design-component-validation system 104 as performing the actions as a shorthand. Additionally, this disclosure refers to various user interactions indicated by FIGS. 4A-4F, such as when the computing device 400 detects a user selection of a selectable option. While the computing device 400 appears as a tablet in FIGS. 4A-4F, the computing device 400 may alternatively be any type of computing device, such as a desktop, laptop, or mobile device (e.g., smart phone), and may also detect any suitable user interaction, including, but not limited to, an audio input into a microphone, mouse click, keyboard input, a touch gesture on a touch screen, or a stylus interaction with a touch screen.

Turning back now to FIG. 4A, this figure illustrates the computing device 400 presenting a user interface 408 with a canvas 404 of the design-component-validation system 104 on a screen 402. As shown, the canvas 404 includes design components 406a-406c. In some embodiments, the canvas 404 and the design components 406a-406c are part of (or correspond to data within) an interface-design file.

In certain implementations, the canvas 404 corresponds to a particular computing platform. For example, in some cases, the canvas 404 corresponds to a particular display-screen size compatible with a particular computing platform. In some such instances, the display-screen size may correspond to a computing device that primarily executes an operating system compatible with a particular computing platform. For instance, the canvas 404 may correspond to a particular computing platform and be compatible with the screen 402 of the computing device 400.

Figure 4A:
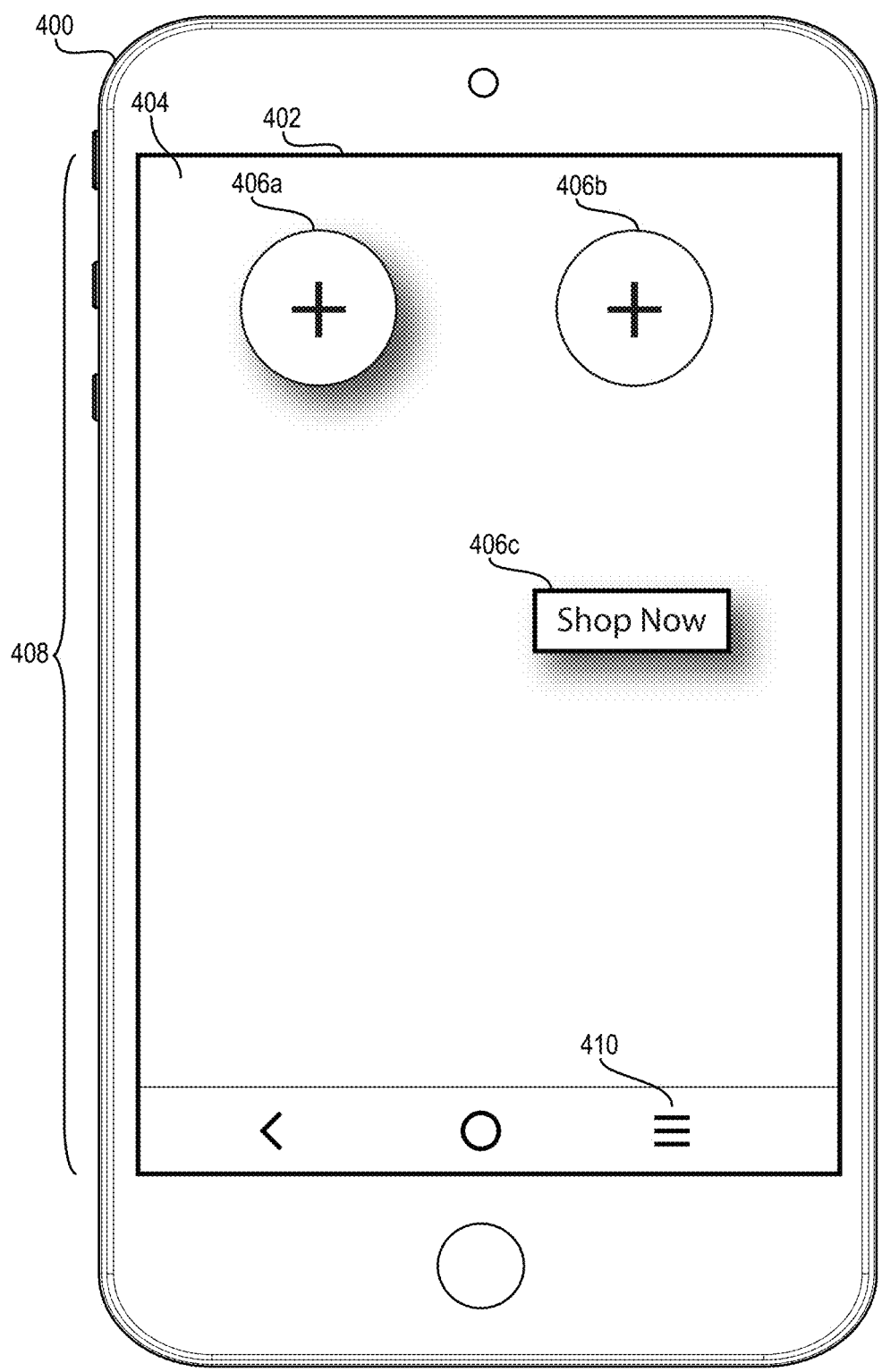
FIGS. 4A-4F illustrate a computing device presenting user interfaces of the design-component-validation system comprising options to select interface-guideline files, a compliance indication and a non-compliance indication for design components, and a selectable option to modify a design component to comply with user-interface guideline in accordance with one or more embodiments.
Figure 4B:
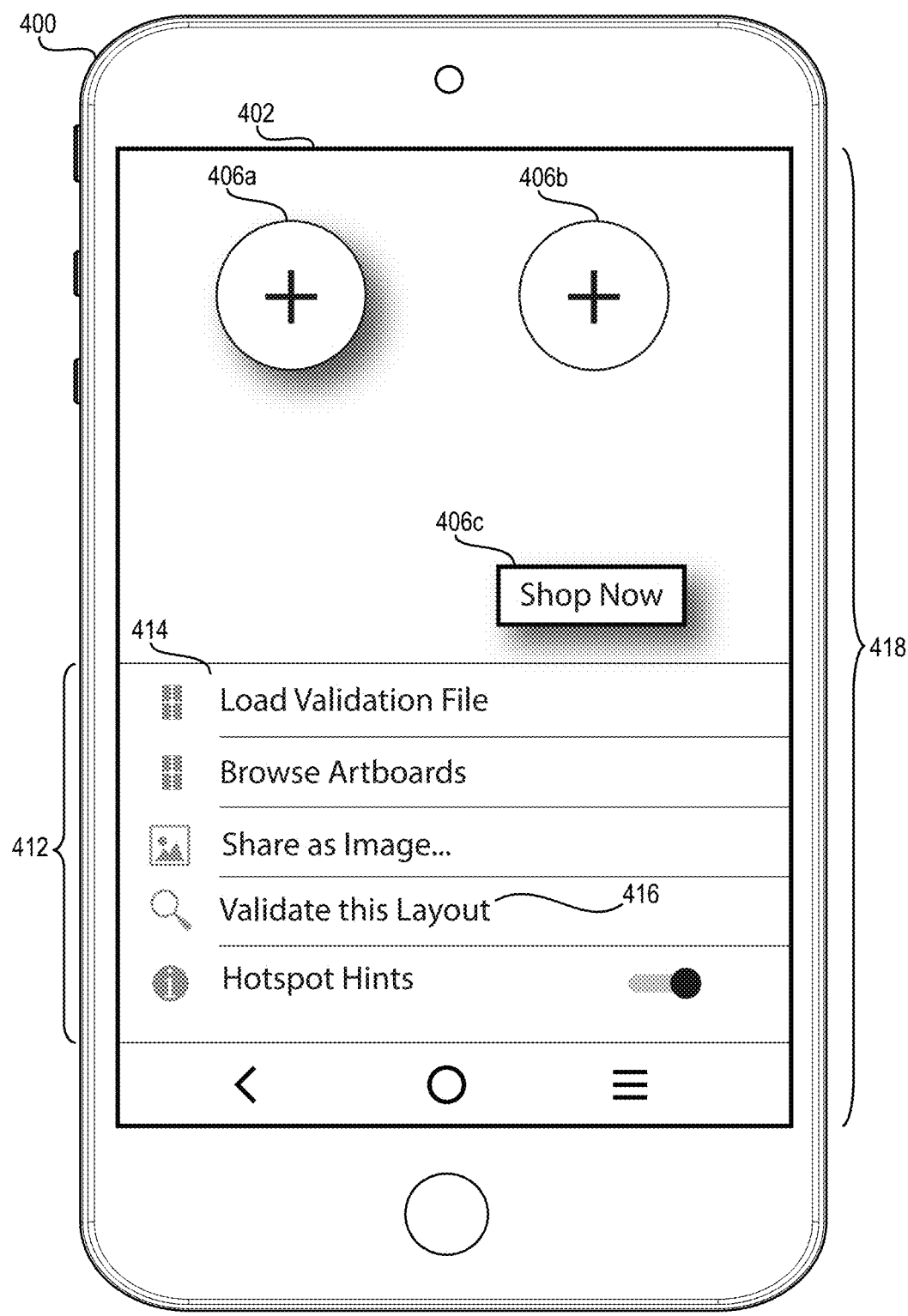
Figure 4C:
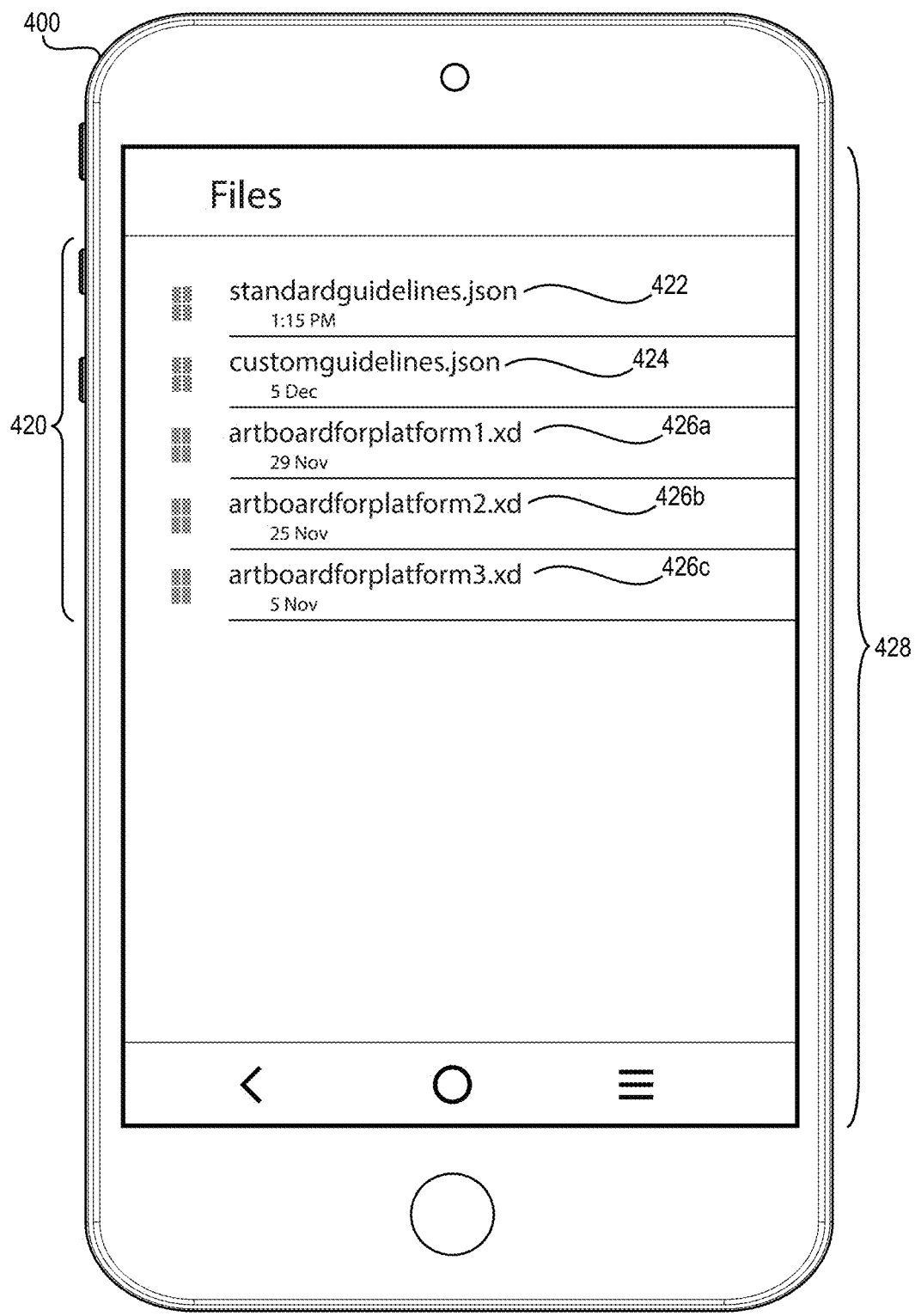
Figure 4D:
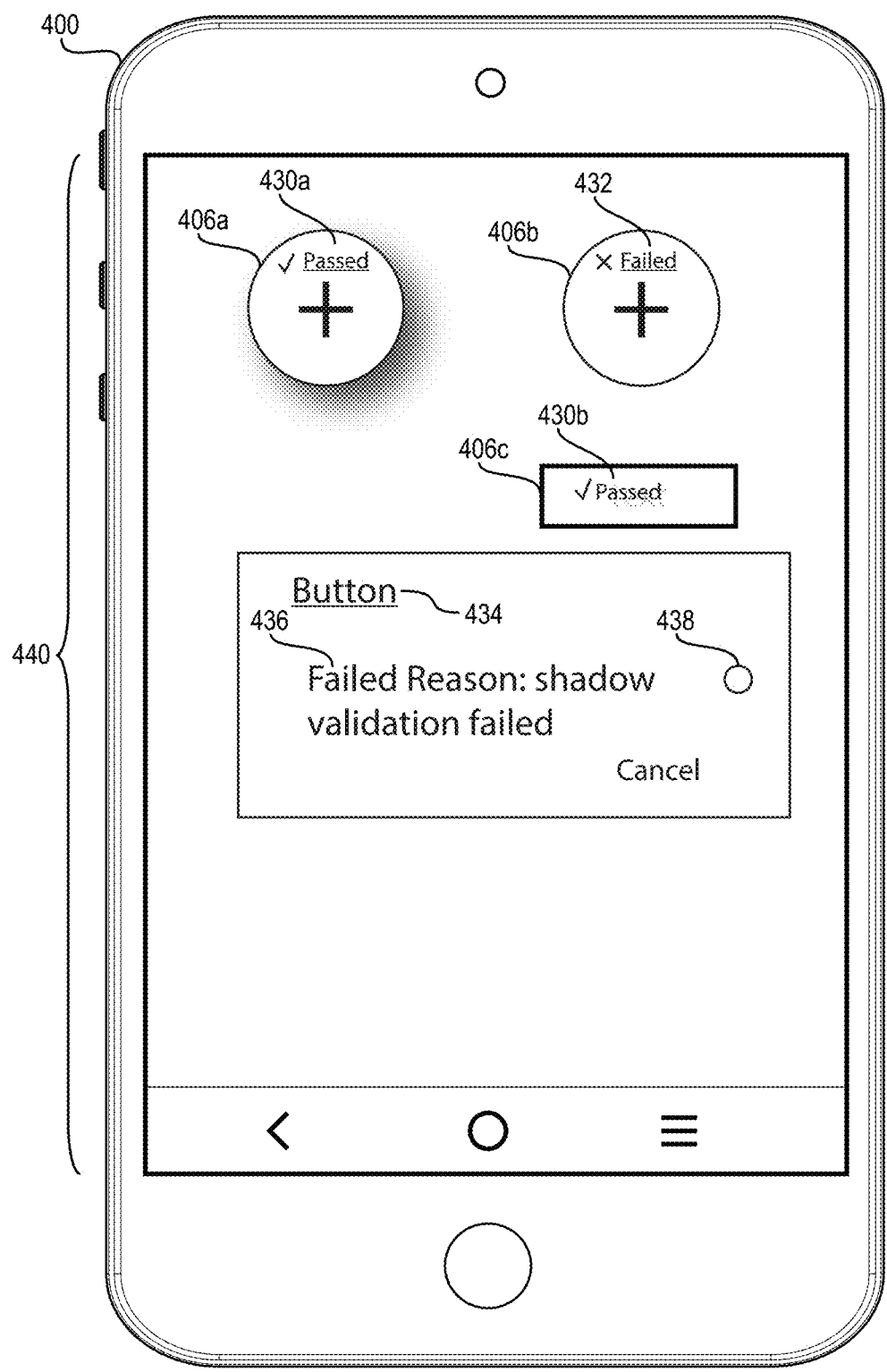

As further shown in FIG. 4A, the user interface 408 comprises a menu option 410. In response to detecting a user selection of the menu option 410, the computing device 400 updates the user interface 408 to include an operation menu for the design-component-validation system 104. In particular, FIG. 4B illustrates a user interface 418 comprising an operation menu 412 of the design-component-validation system 104. As shown, the operation menu 412 includes an interface-guideline-file option 414 to load or otherwise use an interface-guideline file and a validation option 416 to validate design components against user-interface guidelines. FIGS. 4C and 4D illustrate graphical user interfaces corresponding to actions of the design-component-validation system 104 based on detecting user selections of the interface-guideline-file option 414 and the validation option 416, respectively.

As shown in FIG. 4C, for example, in response to detecting a user selection of the interface-guideline-file option 414 to load or otherwise use an interface-guideline file, the computing device 400 presents a user interface 428 comprising a file-selection list 420. The file-selection list 420 includes a standardized-interface-guideline file 422 and a customized-interface-guideline file 424.

As suggested above, the standardized-interface-guideline file 422 comprises standardized-user-interface guidelines against which the design-component-validation system 104 may validate design components. By contrast, the customized-interface-guideline file 424 comprises customized-user-interface guidelines against which the design-component-validation system 104 may validate design components. Consistent with the disclosure above, the design-component-validation system 104 provides a user interface comprising options to compare design components to one or both of standardized-user-interface guidelines or customized-user-interface guidelines. In this particular example, the computing device 400 detects a user selection of either the standardized-interface-guideline file 422 or the customized-interface-guideline file 424 for use in validating the design components 406a-406c.

Although not shown in FIG. 4C, in some embodiments, the design-component-validation system 104 includes options to use both the user-interface-guidelines of the standardized-interface-guideline file 422 and the customized-interface-guideline file 424. In some such embodiments, the design-component-validation system 104 compares and validates design components against the customized-user-interface guidelines of the customized-interface-guideline file 424 as a primary reference and then against the standardized-user-interface guidelines of the standardized-interface-guideline file 422 as a secondary reference. Conversely, in certain embodiments, the design-component-validation system 104 may change priority by comparing and validating design components against the standardized-user-interface guidelines of the standardized-interface-guideline file 422 as a primary reference and then against the customized-user-interface guidelines of the customized-interface-guideline file 424 as a secondary reference.

Turning back now to FIG. 4D, as noted above, this figure illustrates a user interface 440 corresponding to an action taken by the design-component-validation system 104 based on detecting a user selection of the validation option 416. In particular, in response to detecting a user selection of the validation option 416, the computing device 400 categorizes the design components 406a-406c as platform widgets corresponding to a computing platform and determines whether the design components 406a-406c comply with user-interface guidelines for the categorized platform widgets.

Based on the compliance determinations, the computing device 400 presents the user interface 440 comprising compliance indications 430a and 430b and non-compliance indication 432. The compliance indications 430a and 430b indicate that the design components 406a and 406c comply with user-interface guidelines for platform widgets as to which the design components 406a and 406c have been categorized. By contrast, the non-compliance indication 432 indicates that the design component 406b does not comply with user-interface guidelines for a platform widget as to which the design component 406b has been categorized.

As further shown in FIG. 4D, based on the compliance determinations, the computing device 400 further presents a platform-widget indicator 434 for the design component 406b, a non-compliance account 436, and a modifications option 438. The platform-widget indicator 434 indicates the platform widget as to which the design component 406b has been categorized. Although not shown in FIG. 4D, in certain embodiments, the design-component-validation system 104 provides platform-widget indicators for each design component categorized by a design-component-neural network. As further shown in FIG. 4D, the non-compliance account 436 provides an explanation or reason for why the design component 406b does not comply with user-interface guidelines for the relevant platform widget. When selected, the modifications option 438 facilitates the computing device 400 in presenting options to modify the design component 406b to comply with the user-interface guidelines.

Figure 4E:
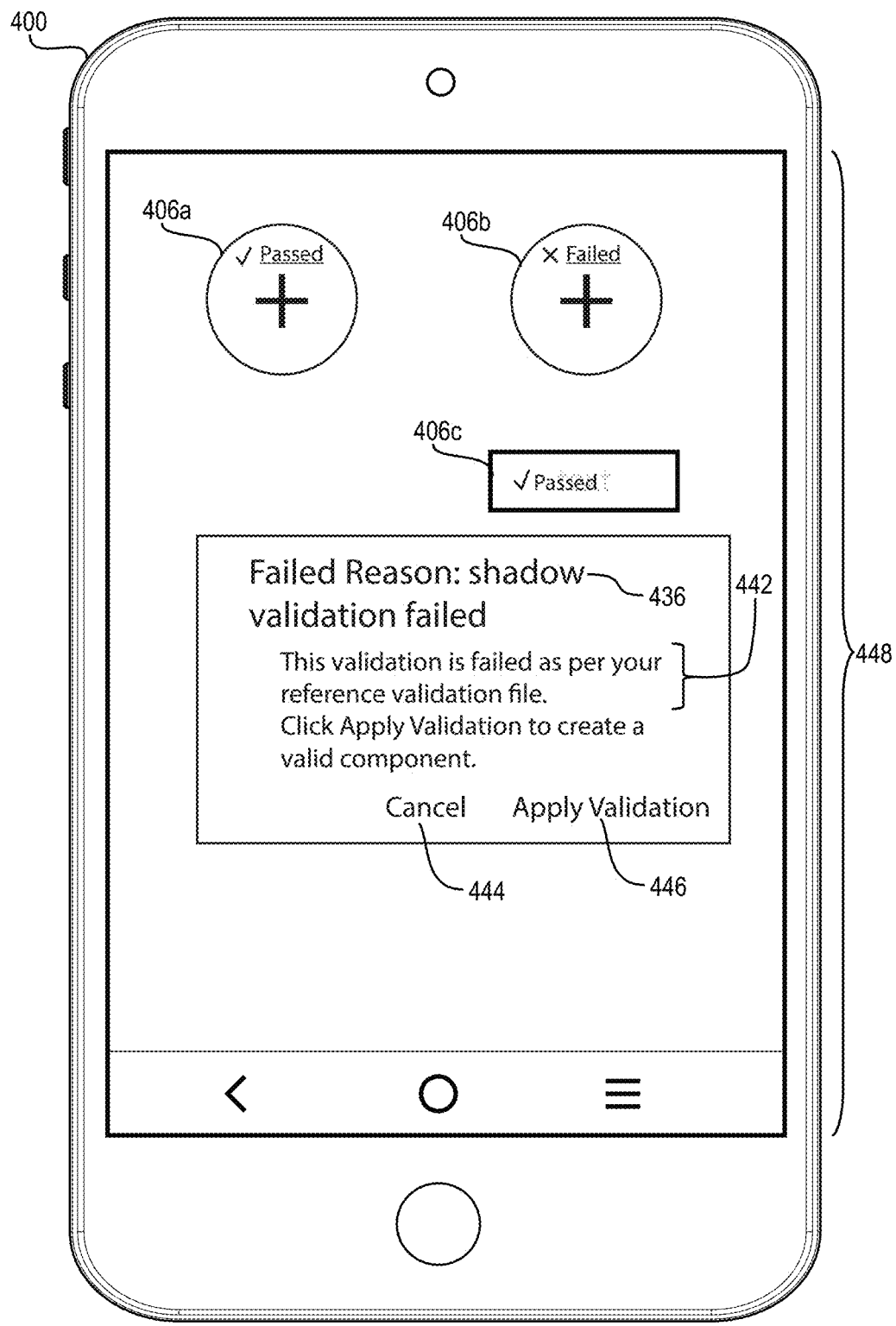

In some embodiments, in response to detecting a user selection of the modifications option 438, the computing device 400 updates the user interface 440 to include further information and options for the non-compliant design component—that is, the design component 406b. As shown in FIG. 4E, for example, in response to detecting a user selection of the modifications option 438, the computing device 400 presents a user interface 448 comprising an interface-guideline-file indicator 442. The interface-guideline-file indicator 442 identifies the interface-guideline file comprising the user-interface guideline with which the design component 406b fails to comply.

As further shown in FIG. 4E, the computing device 400 presents within the user interface 448 a selectable option 444 to decline modifying the design component 406b to comply with a user-interface guideline and a selectable option 446 to modify the design component 406b to comply with the user-interface guideline. Consistent with the disclosure above, upon detecting a user selection of the selectable option 446, the computing device 400 modifies the design component 406b within a corresponding interface-design file to generate an adjusted design component in compliance with the user-interface guideline.

FIGS. 4D and 4E are merely examples of user interfaces comprising a platform-widget indicator, compliance indications, non-compliance accounts, an interface-guideline-file indicator, and selectable options to modify or decline modification of a design component. The design-component-validation system 104 may present any combination of compliance indications, non-compliance accounts, an interface-guideline-file indicator, or selectable options to modify or decline modification of a design component within a user interface. For example, in some implementations, the computing device 400 presents the platform-widget indicator 434, the interface-guideline-file indicator 442, the non-compliance account 436, and the selectable options 444 and 446 within a single user interface. In addition to combining such user-interface components, in some cases, the design-component-validation system 104 presents a user interface that includes multiple non-compliance accounts explaining why a design component does not comply with multiple user-interface guidelines for a platform widget.

Figure 4F:
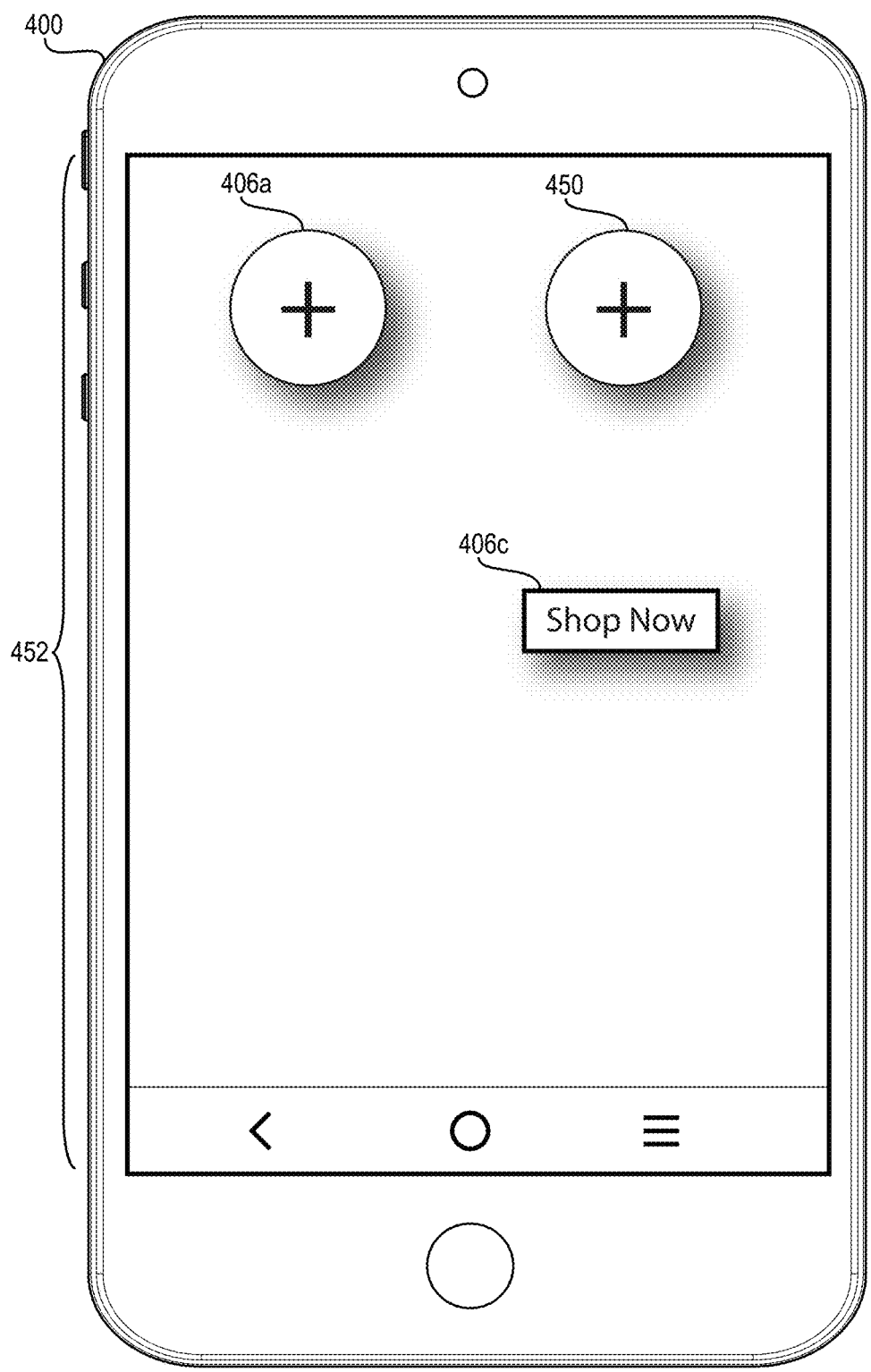

As noted above, in certain embodiments, the design-component-validation system 104 presents or renders a modified user interface corresponding to an interface-design file comprising an adjusted design component. FIG. 4F illustrates an example of one such modified user interface and adjusted design component. As shown in FIG. 4F, in response to detecting a user selection of the selectable option 446, the computing device 400 identifies within an interface-design file a graphic node corresponding to the non-compliant design component—that is, the design component 406b. The design-component-validation system 104 further adjusts a non-compliant nodal property to comply with a widget-guideline property from among user-interface guidelines for the platform widget as to which the design component 206b has been categorized. By modifying the non-compliant nodal property, the design-component-validation system 104 generates a modified design component.

As shown in FIG. 4F, the computing device 400 generates and renders an adjusted design component 450 within a modified user interface 452. The modified user interface 452 also comprises the design components 406a and 406c already determined as compliant. The adjusted design component 450 represents a modified version of the design component 406b. By modifying the design component 406b to include an adjusted nodal property, the design-component-validation system 104 generates the adjusted design component 450 in compliance with a user-interface guideline for the relevant platform widget. Accordingly, as shown by a comparison of FIGS. 4A and 4F, the design-component-validation system 104 changes a shadow-nodal property of the design component 406b to comply with a user-interface guideline. The change to a shadow-nodal property is merely illustrative. The design-component-validation system 104 may modify any nodal property to comply with a user-interface guideline and render a modified user interface comprising an adjusted design component.

Figure 5:
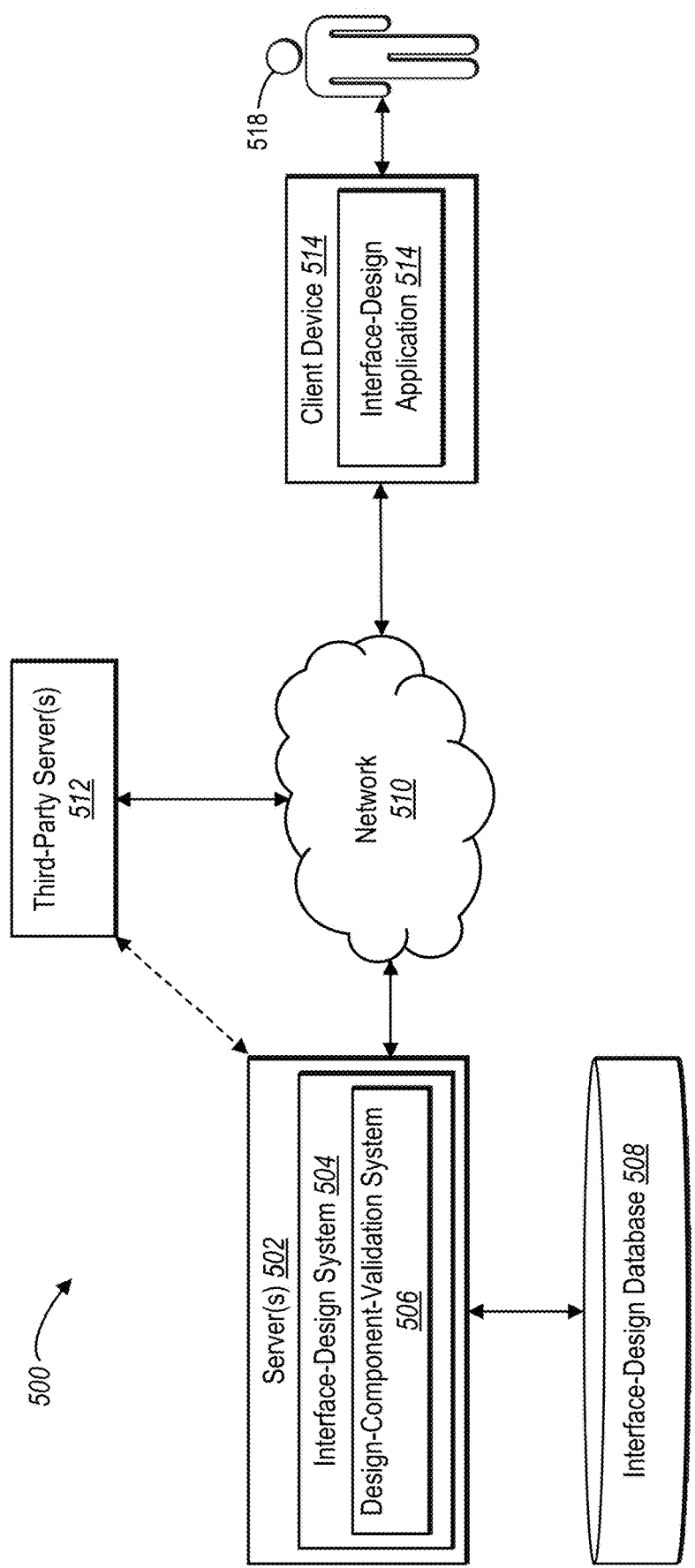
FIG. 5 illustrates a block diagram of an environment in which a design-component-validation system can operate in accordance with one or more embodiments.
Figure 6:
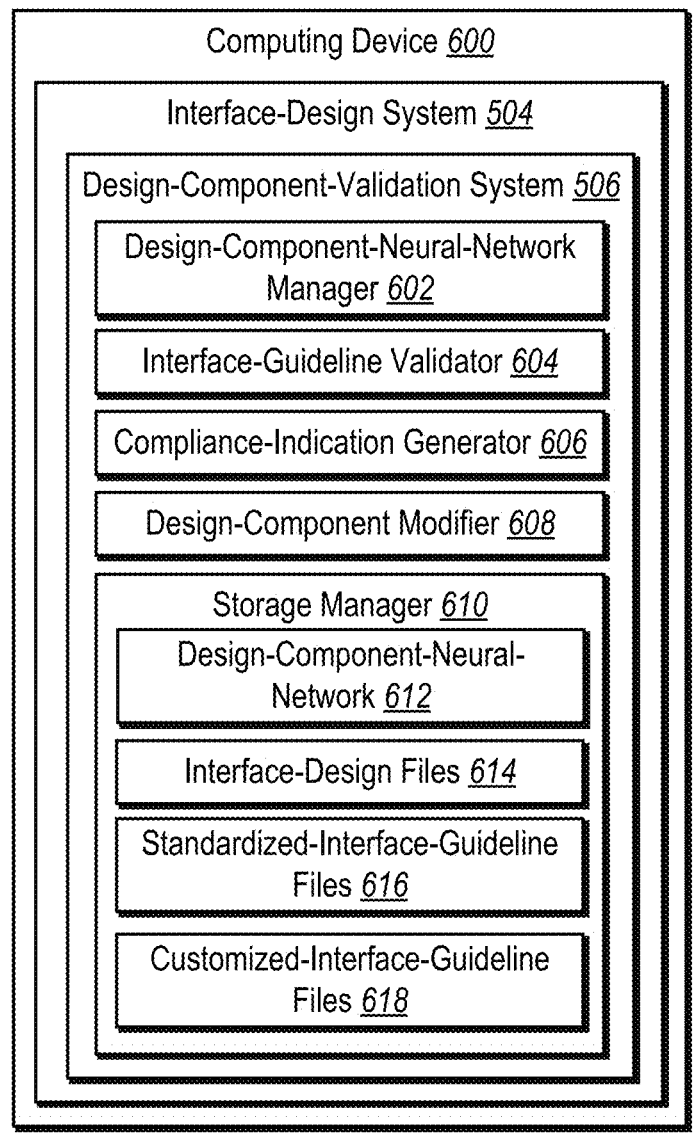
FIG. 6 illustrates a schematic diagram of the design-component-validation system of FIG. 5 in accordance with one or more embodiments.

Turning now to FIGS. 5 and 6, these figures provide an overview of an environment in which a design-component-validation system can operate and an example of an architecture for the design-component-validation system. FIG. 5 is a block diagram illustrating an environment 500 in which a design-component-validation system 506 (i.e., an embodiment the design-component-validation system discussed above) can operate in accordance with one or more embodiments. As illustrated in FIG. 5, the environment 500 includes server(s) 502; third-party server(s) 512; a client device 514; a user 518; and a network 510, such as the Internet. The server(s) 502 can host an interface-design system 504 that includes the design-component-validation system 506. In general, the interface-design system 504 facilitates the creation, modification, sharing, accessing, storing, and/or deletion of graphical user interfaces and user-experience workflows (e.g., graphical user interfaces designed for particular computing platforms). As shown in FIG. 5, the interface-design system 504 also includes the design-component-validation system 506.

Although FIG. 5 illustrates an arrangement of the server(s) 502, the client device 514, and the network 510, various additional arrangements are possible. For example, the client device 514 may directly communicate with the server(s) 502 and thereby bypass the network 510. Alternatively, in certain embodiments, the client device 514 includes all (or a portion) of the design-component-validation system 506. Indeed, the client device 514 may include the design-component-validation system 506 and perform all of the functions, methods, and processes of the design-component-validation system described above. For explanatory purposes only, the following paragraphs describe the server(s) 502 as including the design-component-validation system 506.

As further illustrated in FIG. 5, the client device 514 communicates through the network 510 with the design-component-validation system 506 via the server(s) 502. Accordingly, the user 518 can access one or more interface-design files, user interfaces, design components, graphic nodes, interface-guideline files, or software applications provided (in whole or in part) by the design-component-validation system 506, including to download an interface-design application 516. Additionally, in some embodiments, the third-party server(s) 512 provide data to the server(s) 502 that enable the design-component-validation system 506 to access, download, or upload interface-design files, user interfaces, design components, graphic nodes, or interface-guideline files via the server(s) 502.

As also shown in FIG. 5, in some embodiments, the design-component-validation system 506 accesses, manages, analyzes, and queries data corresponding to interface-design files, user interfaces, design components, graphic nodes, or interface-guideline files, such as when identifying design components within an interface-design file selected by the client device 514. For example, in some embodiments, the design-component-validation system 506 provides an interface-design file to a design-component-neural network.

To access the functionalities of the design-component-validation system 506, in certain embodiments, the user 518 interacts with the interface-design application 516 on the client device 514. In some embodiments, the interface-design application 516 comprises a web browser, applet, or other software application (e.g., native application) available to the client device 514. Additionally, in some instances, the interface-design application 516 is integrated within an application or a webpage. While FIG. 5 illustrates one client device and one user, in alternative embodiments, the environment 500 includes more than the client device 514 and the user 518. For example, in other embodiments, the environment 500 includes hundreds, thousands, millions, or billions of users and corresponding client devices.

In one or more embodiments, the client device 514 transmits data corresponding to interface-design files, user interfaces, design components, graphic nodes, or interface-guideline files through the network 510 to the design-component-validation system 506. For instance, the client device 514 can download interface-design files, design components, or interface-guideline files; download software applications; or upload interface-design files, design components, or interface-guideline files. To generate the transmitted data or initiate communications, the user 518 interacts with the client device 514. The client device 514 may include, but is not limited to, mobile devices (e.g., smartphones, tablets), laptops, desktops, or any other type of computing device, such as those described below in relation to FIG. 9. Similarly, the network 510 may comprise any of the networks described below in relation to FIG. 9.

For example, in some embodiments, the server(s) 502 provide an interface-design file to a design-component-neural network and generate a design-feature indicator for the design component using object-recognition layers of the design-component-neural network. Based on the design-feature indicator for the design component, the server(s) 502 further categorize the design component as a platform widget corresponding to a computing platform using platform-component-recognition layers of the design-component-neural network. As suggested above, in some cases, the server(s) 502 compare and validate nodal properties of the design component against related user-interface guidelines for the platform widget corresponding to the computing platform. When the server(s) 502 determine that the design component does not comply with a user-interface guideline, the server(s) 502 optionally provide and implement options to modify the design component to comply with the user-interface guideline.

As also illustrated in FIG. 5, the interface-design system 504 is communicatively coupled to an interface-design database 508. In one or more embodiments, the interface-design system 504 accesses and queries data from the interface-design database 508 associated with requests from the design-component-validation system 506. For instance, the interface-design system 504 may access interface-design files, user interfaces, design components, graphic nodes, or interface-guideline files from the interface-design database 508 for the design-component-validation system 506. As shown in FIG. 5, the interface-design database 508 is separately maintained from the server(s) 502. Alternatively, in one or more embodiments, the interface-design system 504 and the interface-design database 508 comprise a single combined system or subsystem within the server(s) 502.

Turning now to FIG. 6, this figure provides additional detail regarding components and features of the design-component-validation system 506. In particular, FIG. 6 illustrates a computing device 600 implementing the interface-design system 504 and the design-component-validation system 506. In some embodiments, the computing device 600 comprises one or more servers (e.g., the server(s) 502). In other embodiments, the computing device 600 comprises one or more client devices (e.g., the client device 514).

As shown in FIG. 6, the computing device 600 includes the interface-design system 504. In some embodiments, the interface-design system 504 uses its components to render graphical user interfaces from interface-design files comprising design components. Additionally, in some cases, the interface-design system 504 facilitates the creation, modification, sharing, accessing, storing, and/or deletion of graphical user interfaces and user-experience workflows (e.g., graphical user interfaces for particular computing platforms).

As further shown in FIG. 6, the computing device 600 includes the design-component-validation system 506. The design-component-validation system 506 includes, but is not limited to, a design-component-neural-network manager 602, an interface-guideline validator 604, a compliance-indication generator 606, a design-component modifier 608, and a storage manager 610. The following paragraphs describe each of these components in turn.

The design-component-neural-network manager 602 trains and applies a design-component-neural network 612. The design-component-neural network 612 is an embodiment of the design-component-neural networks described above and includes object-recognition layers and one or more platform-component-recognition layers. Consistent with the disclosure above, in some embodiments, the design-component-neural-network manager 602 trains the design-component-neural network 612 to categorize training-design components as predicted-platform widgets corresponding to computing platforms. Additionally, or alternatively, in certain implementations, the design-component-neural-network manager 602 applies the design-component-neural network 612 to categorize design components as platform widgets corresponding to computing platforms.

As further shown in FIG. 6, the interface-guideline validator 604 is an embodiment of the interface-guideline validator described above. The interface-guideline validator 604 determines whether design components comply with user-interface guidelines for platform widgets corresponding to particular computing platforms. For example, in certain embodiments, the interface-guideline validator 604 determines that design components comply with (or diverge from) customized-user-interface guidelines or standardized-user-interface guidelines. As suggested above, in certain implementations, the interface-guideline validator 604 identifies nodal properties of a graphic node and compares the nodal properties to corresponding widget-guideline properties of user-interface guidelines for a platform widget.

As further shown in FIG. 6, the compliance-indication generator 606 provides compliance indications to a client device for display within a user interface or presents compliance indications within a user interface. For example, when the interface-guideline validator 604 determines that one or more design components comply with or diverge from user-interface guidelines, in some embodiments, the compliance-indication generator 606 provides or presents the following indicators within a user interface: (i) compliance indications that design components comply with user-interface guidelines for corresponding platform widgets or (ii) non-compliance indications that design components do not comply with user-interface guidelines for corresponding platform widgets.

As further shown in FIG. 6, the design-component modifier 608 provides selectable options to modify design components and (in some cases) modifies design components to comply with user-interface guidelines. For example, in response to receiving an indication of (or detecting) a selection of a selectable option to modify a design component, the design-component modifier 608 modifies the design component within a corresponding interface-design file to generate an adjusted design component in compliance with a user-interface guideline for a platform widget. In some embodiments, the design-component modifier 608 further renders a modified user interface corresponding to the interface-design file comprising the adjusted design component.

As also shown in FIG. 6, the design-component-validation system 506 includes the storage manager 610. In certain embodiments, the storage manager 610 includes non-transitory computer readable media. Among other things, the storage manager 610 maintains the design-component-neural network 612, interface-design files 614, standardized-interface-guideline files 616, and/or customized-interface-guideline files 618. Consistent with the disclosure above, in some embodiments, the interface-design files 614 each comprise one or more user interfaces and corresponding design components. Additionally, the standardized-interface-guideline files 616 comprise standardized-user-interface guidelines for platform widgets corresponding to particular computing platforms. Similarly, the customized-interface-guideline files 618 comprise customized-user-interface guidelines for platform widgets corresponding to particular computing platforms.

In some implementations, the design-component-neural-network manager 602, the interface-guideline validator 604, the compliance-indication generator 606, and/or the design-component modifier 608 communicate with the storage manager 610 to access the design-component-neural network 612 or various data files. For example, the design-component-neural-network manager 602 can access the design-component-neural network 612 and some of the interface-design files 614 maintained by the storage manager 610 for training or application purposes. In certain embodiments, the interface-guideline validator 604 accesses some of the interface-design files 614, the standardized-interface-guideline files 616, and/or the customized-interface-guideline files 618 maintained by the storage manager 610. Additionally, in some cases, the design-component modifier 608 accesses the interface-design files 614 maintained by the storage manager 610 to modify design components.

Each of the components 602-618 of the design-component-validation system 506 can include software, hardware, or both. For example, the components 602-618 can include one or more instructions stored on a computer-readable storage medium and executable by processors of one or more computing devices, such as a client device or server device. When executed by the one or more processors, the computer-executable instructions of the design-component-validation system 506 can cause the computing device(s) to perform the methods described herein. Alternatively, the components 602-618 can include hardware, such as a special-purpose processing device to perform a certain function or group of functions. Alternatively, the components 602-618 of the design-component-validation system 506 can include a combination of computer-executable instructions and hardware.

Furthermore, the components 602-618 of the design-component-validation system 506 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-618 may be implemented as a stand-alone application, such as a desktop or mobile application. Furthermore, the components 602-618 may be implemented as one or more web-based applications hosted on a remote server. The components 602-618 may also be implemented in a suite of mobile device applications or "apps." To illustrate, the components 602-618 may be implemented in a software application, including, but not limited to, ADOBE® EXPERIENCE DESIGN®, ADOBE® CREATIVE CLOUD®, ADOBE® PHOTOSHOP®, or ADOBE® LIGHTROOM®. "ADOBE," "CREATIVE CLOUD," "PHOTOSHOP," and "LIGHTROOM" are either registered trademarks or trademarks of Adobe Systems Incorporated in the United States and/or other countries.

Figure 7:
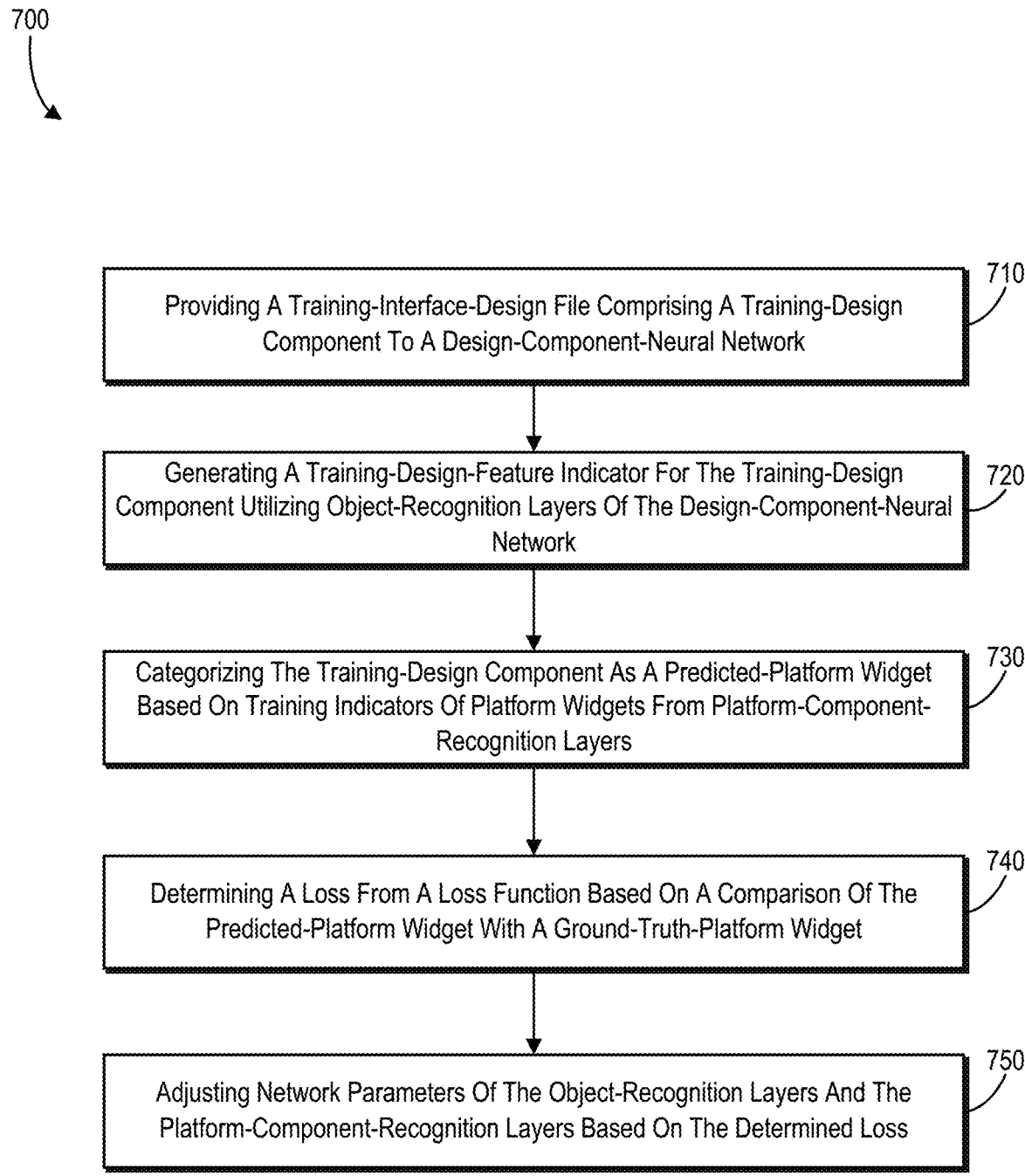
FIG. 7 illustrates a flowchart of a series of acts for training a design-component-neural network to categorize design components as platform widgets corresponding to particular computing platforms in accordance with one or more embodiments.

Turning now to FIG. 7, this figure illustrates a flowchart of a series of acts 700 of training a design-component-neural network to categorize design components as platform widgets corresponding to particular computing platforms in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of providing a training-interface-design file comprising a training-design component to a design-component-neural network. In some embodiments, the design-component-neural network comprises a convolutional neural network.

As further shown in FIG. 7, the acts 700 include an act 720 of generating a training-design-feature indicator for the training-design component utilizing object-recognition layers of the design-component-neural network. In certain embodiments, the object-recognition layers comprise one of an Inception module or a residual neural network. Further, in some cases, the training-design-feature indicator comprises one of a training-design-feature array, a training-design-feature vector, a training-design-feature matrix, or a training-design-feature map.

As further shown in FIG. 7, the acts 700 include an act 730 of categorizing the training-design component as a predicted-platform widget based on training indicators of platform widgets from platform-component-recognition layers. For example, in certain implementations, the act 730 includes categorizing the training-design component as a predicted-platform widget based on the training-design-feature indicator for the training-design component from the object-recognition layers and training indicators of platform widgets from a first platform-component-recognition layer and a second platform-component-recognition layer. In some embodiments, the first platform-component-recognition layer comprises a first softmax layer; and the second platform-component-recognition layer comprises a second softmax layer.

As suggested above, in certain embodiments, categorizing the training-design component as the predicted-platform widget based on the training indicators of platform widgets from the first platform-component-recognition layer and the second platform-component-recognition layer comprises: providing the training-design-feature indicator to the first platform-component-recognition layer to generate a first training-probability indicator that the training-design component corresponds to a first predicted-platform widget for the first computing platform; providing the training-design-feature indicator to the second platform-component-recognition layer to generate a second training-probability indicator that the training-design component corresponds to a second predicted-platform widget for the second computing platform; determining that the first training-probability indicator indicates a higher probability that the training-design component corresponds to the first predicted-platform widget than to the second predicted-platform widget; and categorizing the training-design component as the first predicted-platform widget for the first computing platform based on determining that the first training-probability indicator indicates the higher probability that the training-design component corresponds to the first predicted-platform widget.

As further shown in FIG. 7, the acts 700 include an act 740 of determining a loss from a loss function based on a comparison of the predicted-platform widget with a ground-truth-platform widget. For example, in some embodiments, the act 740 includes determining a loss from a loss function based on a comparison of the predicted-platform widget with a ground-truth-platform widget for a ground-truth-computing platform. In certain implementations, the loss function comprises a cross-entropy-loss function, an average-binary-cross-entropy-loss function, loss for a positive regressor, or a mean-squared-error function.

As further shown in FIG. 7, the acts 700 include an act 750 of adjusting network parameters of the object-recognition layers and the platform-component-recognition layers based on the determined loss. For example, in some embodiments, the act 750 includes adjusting network parameters of the object-recognition layers, the first platform-component-recognition layer, and the second platform-component-recognition layer based on the determined loss.

Figure 8:
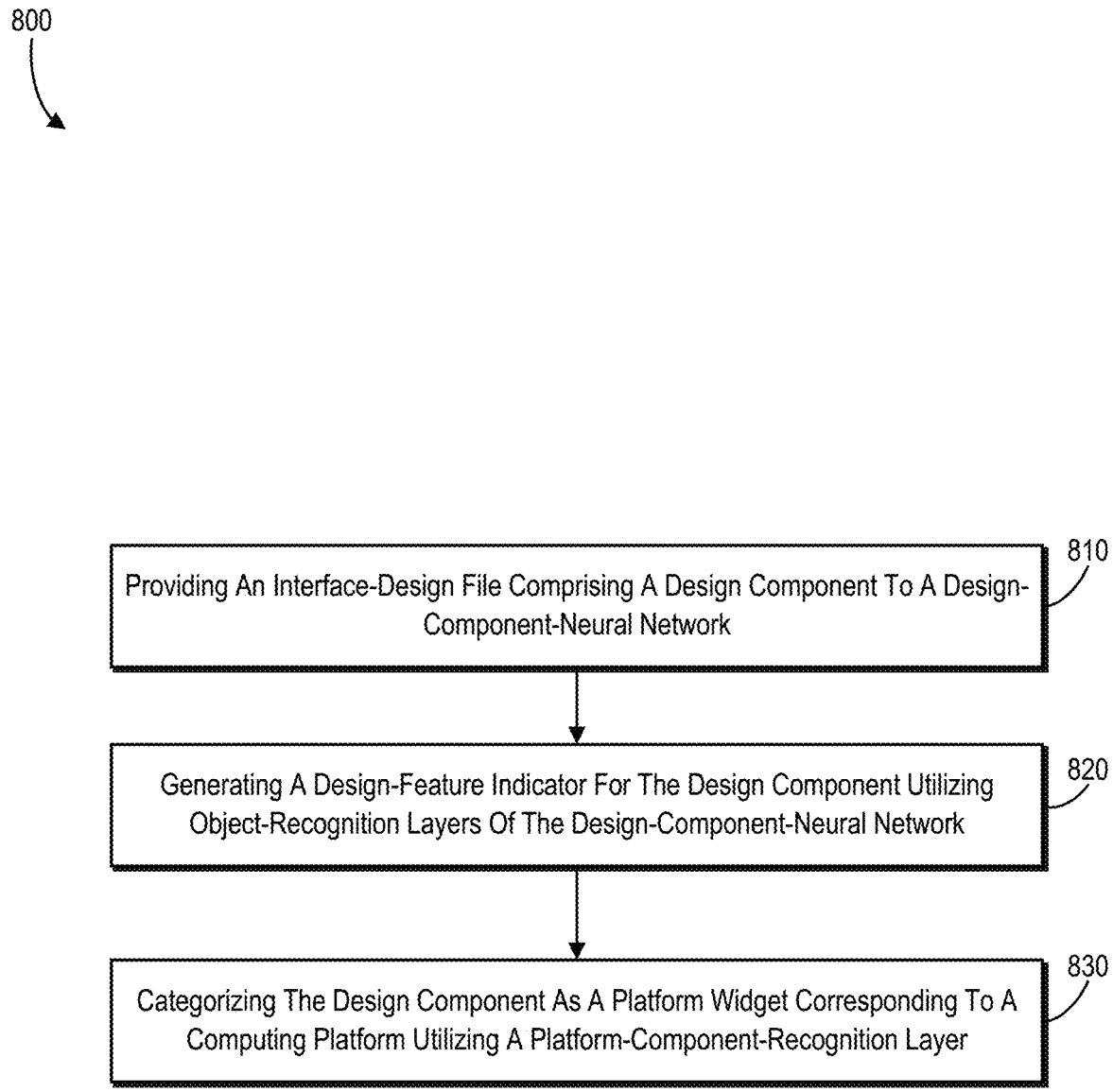
FIG. 8 illustrates a flowchart of a series of acts for categorizing a design component from an interface-design file and (in some embodiments) validating the design component against user-interface guidelines for a computing platform in accordance with one or more embodiments.

Turning now to FIG. 8, this figure illustrates a flowchart of a series of acts 800 of categorizing a design component from an interface-design file and (in some embodiments) validating the design component against user-interface guidelines for a computing platform in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer readable storage medium can comprise instructions that, when executed by one or more processors, cause a computing device to perform the acts depicted in FIG. 8. In still further embodiments, a system can perform the acts of FIG. 8.

As shown in FIG. 8, the acts 800 include an act 810 of providing an interface-design file comprising a design component to a design-component-neural network. For example, in some embodiments, the act 810 includes providing an interface-design file to a design-component-neural network, wherein: the interface-design file contains a design component; and the design-component-neural network comprises object-recognition layers and a platform-component-recognition layer. In certain implementations, a client device identifies the interface-design file. In some embodiments, the design-component-neural network comprises a convolutional neural network; the object-recognition layers comprise one of an Inception module or a residual neural network; and the platform-component-recognition layer comprises a softmax layer.

As further shown in FIG. 8, the acts 800 include an act 820 of generating a design-feature indicator for the design component utilizing object-recognition layers of the design-component-neural network. In certain embodiments, the design-feature indicator comprises one of a design-feature array, a design-feature vector, a design-feature matrix, or a design-feature map.

As further shown in FIG. 8, the acts 800 include an act 830 of categorizing the design component as a platform widget corresponding to a computing platform utilizing a platform-component-recognition layer. For example, in certain implementations, the act 830 includes, based on the design-feature indicator for the design component, categorizing the design component as a platform widget corresponding to a computing platform utilizing the platform-component-recognition layer.

In addition to the acts 810-830, in some embodiments, the acts 800 further include, based on categorizing the design component as the platform widget, determining whether the design component complies with a user-interface guideline for the platform widget. In certain implementations, determining whether the design component complies with the user-interface guideline for the platform widget comprises determining that the design component complies with the user-interface guideline for the platform widget. By contrast, in some cases, determining whether the design component complies with the user-interface guideline for the platform widget comprises determining that the design component does not comply with the user-interface guideline for the platform widget. Similarly, in certain implementations, determining whether the design component complies with the user-interface guideline for the platform widget comprises determining that a nodal property of a graphic node corresponding to the design component does not comply with a user-interface guideline for the platform widget.

Relatedly, in one or more embodiments, determining that the design component does not comply with the user-interface guideline for the platform widget comprises: based on categorizing the design component as the platform widget, identifying nodal properties of a graphic node corresponding to the design component; comparing the nodal properties of the graphic node to user-interface guidelines for the platform widget; and determining that a nodal property of the graphic node corresponding to the design component does not comply with a user-interface guideline for the platform widget.

Similarly, in some implementations, determining whether the design component complies with the user-interface guideline for the platform widget comprises determining that the design component does not comply with the user-interface guideline for the platform widget by: based on categorizing the design component as the platform widget, identifying nodal properties of a graphic node corresponding to the design component; comparing the nodal properties of the graphic node with widget-guideline properties from user-interface guidelines for the platform widget; and determining that a nodal property of the graphic node corresponding to the design component does not comply with a widget-guideline property from a user-interface guideline for the platform widget.

Additionally, in certain implementations, the acts 800 further include, based on determining that the design component does not comply with the user-interface guideline for the platform widget, presenting within a user interface of a client device: a non-compliance indication that the design component does not comply with the user-interface guideline for the platform widget; and a selectable option to modify the design component to comply with the user-interface guideline for the platform widget. By contrast, in some embodiments, the acts 800 further include, based on determining that the design component complies with the user-interface guideline for the platform widget, presenting within a user interface of a client device a compliance indication that the design component complies with the user-interface guideline for the platform widget.

Further, in some embodiments, the acts 800 further include, in response to detecting a selection of the selectable option to modify the design component, modifying the design component within the interface-design file to generate an adjusted design component in compliance with the user-interface guideline for the platform widget. Similarly, in certain implementations, the acts 800 further include, in response to detecting a selection of the selectable option to modify the design component, modifying the nodal property of the graphic node within the interface-design file to generate an adjusted nodal property of the graphic node in compliance with the user-interface guideline for the platform widget.

Moreover, in some cases, the acts 800 further include rendering on the client device a modified user interface corresponding to the interface-design file comprising the adjusted design component. Similarly, in certain implementations, the acts 800 further include rendering on the client device a modified user interface corresponding to the interface-design file comprising the adjusted nodal property of the graphic node.

As suggested above, in certain embodiments, the acts 800 further include receiving a customized-interface-guideline file comprising a customized-user-interface guideline for the platform widget; and based on categorizing the design component as the platform widget, determining that a nodal property of a graphic node corresponding to the design component does not comply with the customized-user-interface guideline for the platform widget.

In addition (or in the alternative) to the acts describe above, in some embodiments, the acts 800 include performing a step for classifying the design component as a platform widget for a computing platform utilizing the design-component-neural network. For instance, the algorithms and acts described in reference to FIG. 2B can comprise the corresponding acts for performing a step for classifying the design component as a platform widget for a computing platform utilizing the design-component-neural network.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
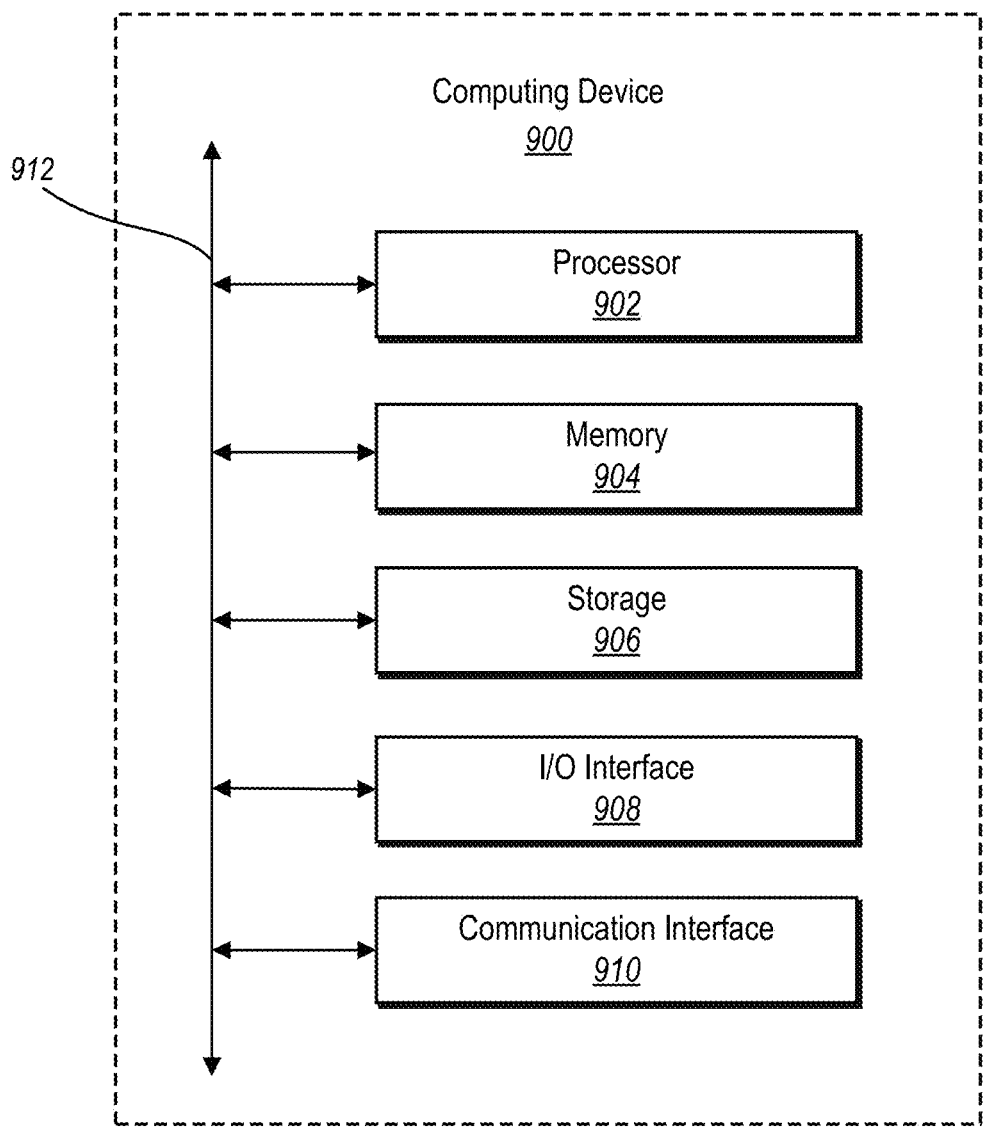
FIG. 9 illustrates a block diagram of an exemplary computing device for implementing one or more embodiments of the present disclosure.

FIG. 9 illustrates a block diagram of exemplary computing device 900 that may be configured to perform one or more of the processes described above. As shown by FIG. 9, the computing device 900 can comprise a processor 902, a memory 904, a storage device 906, an I/O interface 908, and a communication interface 910, which may be communicatively coupled by way of a communication infrastructure 912. In certain embodiments, the computing device 900 can include fewer or more components than those shown in FIG. 9. Components of the computing device 900 shown in FIG. 9 will now be described in additional detail.

In one or more embodiments, the processor 902 includes hardware for executing instructions, such as those making up a computer program. As an example, and not by way of limitation, to execute instructions for digitizing real-world objects, the processor 902 may retrieve (or fetch) the instructions from an internal register, an internal cache, the memory 904, or the storage device 906 and decode and execute them. The memory 904 may be a volatile or non-volatile memory used for storing data, metadata, and programs for execution by the processor(s). The storage device 906 includes storage, such as a hard disk, flash disk drive, or other digital storage device, for storing data or instructions related to object digitizing processes (e.g., digital scans, digital models).

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 910 may facilitate communications with various types of wired or wireless networks. The communication interface 910 may also facilitate communications using various communication protocols. The communication infrastructure 912 may also include hardware, software, or both that couples components of the computing device 900 to each other. For example, the communication interface 910 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium storing instructions thereon that, when executed by at least one processor, cause a computer system to:
   provide an interface-design file to a design-component-neural network, wherein:
      the interface-design file contains a design component; and the design-component-neural network comprises object-recognition layers and a platform-component-recognition layer;
generate a design-feature indicator for the design component utilizing the object-recognition layers; and
based on the design-feature indicator for the design component, categorize the design component as a platform widget corresponding to a computing platform utilizing the platform-component-recognition layer.

2. The non-transitory computer readable medium of claim 1, further comprising instructions that, when executed by the at least one processor, cause the computer system to, based on categorizing the design component as the platform widget, determine whether the design component complies with a user-interface guideline for the platform widget.

3. The non-transitory computer readable medium of claim 2, further comprising instructions that, when executed by the at least one processor, cause the computer system to, determine whether the design component complies with the user-interface guideline for the platform widget by determining that the design component does not comply with the user-interface guideline for the platform widget.

4. The non-transitory computer readable medium of claim 3, further comprising instructions that, when executed by the at least one processor, cause the computer system to determine that the design component does not comply with the user-interface guideline for the platform widget by:
based on categorizing the design component as the platform widget, identifying nodal properties of a graphic node corresponding to the design component;
comparing the nodal properties of the graphic node to user-interface guidelines for the platform widget; and
determining that a nodal property of the graphic node corresponding to the design component does not comply with the user-interface guideline for the platform widget.

5. The non-transitory computer readable medium of claim 3, further comprising instructions that, when executed by the at least one processor, cause the computer system to, based on determining that the design component does not comply with the user-interface guideline for the platform widget, present within a user interface of a client device:
a non-compliance indication that the design component does not comply with the user-interface guideline for the platform widget; and
a selectable option to modify the design component to comply with the user-interface guideline for the platform widget.

6. The non-transitory computer readable medium of claim 5, further comprising instructions that, when executed by the at least one processor, cause the computer system to, in response to detecting a selection of the selectable option to modify the design component, modify the design component within the interface-design file to generate an adjusted design component in compliance with the user-interface guideline for the platform widget.

7. The non-transitory computer readable medium of claim 6, further comprising instructions that, when executed by the at least one processor, cause the computer system to render on the client device a modified user interface corresponding to the interface-design file comprising the adjusted design component.

8. The non-transitory computer readable medium of claim 1, further comprising instructions that, when executed by the at least one processor, cause the computer system to:

receive a customized-interface-guideline file comprising a customized-user-interface guideline for the platform widget; and
based on categorizing the design component as the platform widget, determine that a nodal property of a graphic node corresponding to the design component does not comply with the customized-user-interface guideline for the platform widget.

9. A system comprising:
at least one processor; and
at least one non-transitory computer readable medium comprising a design-component-neural network, wherein the design-component-neural network comprises:
object-recognition layers that, when provided design components from interface-design files, generate design-feature indicators indicating object classifications for the design components;
a first platform-component-recognition layer that, when provided the design-feature indicators, indicates whether the design components correspond to platform widgets for a first computing platform; and
a second platform-component-recognition layer that, when provided the design-feature indicators, indicates whether the design components correspond to platform widgets for a second computing platform.

10. The system of claim 9, wherein:
the object-recognition layers comprise one of an Inception module or a residual neural network;
the design-feature indicators comprise one of design-feature arrays, design-feature vectors, design-feature matrices, or design-feature maps;
the first platform-component-recognition layer comprises a first softmax layer; and
the second platform-component-recognition layer comprises a second softmax layer.

11. The system of claim 9, wherein the at least one non-transitory computer readable medium comprises instructions that, when executed by the at least one processor, cause the system to:
provide a training-interface-design file to the design-component-neural network, wherein the training-interface-design file contains a training-design component;
generate a training-design-feature indicator for the training-design component utilizing the object-recognition layers;
categorize the training-design component as a predicted-platform widget based on the training-design-feature indicator for the training-design component from the object-recognition layers and training indicators of platform widgets from the first platform-component-recognition layer and the second platform-component-recognition layer; and
determine a loss from a loss function based on a comparison of the predicted-platform widget with a ground-truth-platform widget for a ground-truth-computing platform; and
adjust network parameters of the object-recognition layers, first platform-component-recognition layer, and second platform-component-recognition layer based on the determined loss.

12. The system of claim 11, further comprising instructions that, when executed by the at least one processor, cause the system to categorize the training-design component as the predicted-platform widget based on the training indicators of platform widgets from the first platform-component-recognition layer and the second platform-component-recognition layer by:
provproviding the training-design-feature indicator to the first platform-component-recognition layer to generate a first training-probability indicator that the training-design component corresponds to a first predicted-platform widget for the first computing platform;
providing the training-design-feature indicator to the second platform-component-recognition layer to generate a second training-probability indicator that the training-design component corresponds to a second predicted-platform widget for the second computing platform;
determining that the first training-probability indicator indicates a higher probability that the training-design component corresponds to the first predicted-platform widget than to the second predicted-platform widget; and
categorizing the training-design component as the first predicted-platform widget for the first computing platform based on determining that the first training-probability indicator indicates the higher probability that the training-design component corresponds to the first predicted-platform widget.

13. The system of claim 9, further comprising instructions that, when executed by the at least one processor, cause the system to:
provide an interface-design file identified by a client device to the design-component-neural network, wherein the interface-design file contains a design component;
generate a design-feature indicator for the design component utilizing the object-recognition layers; and
based on the design-feature indicator for the design component, categorize the design component as a platform widget corresponding to a computing platform utilizing the first platform-component-recognition layer and the second platform-component-recognition layer.

14. The system of claim 13, further comprising instructions that, when executed by the at least one processor, cause the system to:
based on categorizing the design component as the platform widget, determine that a nodal property of a graphic node corresponding to the design component does not comply with a user-interface guideline for the platform widget; and
based on determining that the nodal property of the graphic node corresponding to the design component does not comply with the user-interface guideline for the platform widget, present within a user interface of the client device:
a non-compliance indication that the design component does not comply with the user-interface guideline for the platform widget; and
a selectable option to modify the design component to comply with the user-interface guideline for the platform widget.

15. The system of claim 14, further comprising instructions that, when executed by the at least one processor, cause the system to, in response to detecting a selection of the selectable option to modify the design component, modify the nodal property of the graphic node within the interface-design file to generate an adjusted nodal property of the graphic node in compliance with the user-interface guideline for the platform widget.

16. The system of claim 15, further comprising instructions that, when executed by the at least one processor, cause the system to render on the client device a modified user interface corresponding to the interface-design file comprising the adjusted nodal property of the graphic node.

17. A computer-implemented method for automatically classifying and validating design components as platform-specific widgets utilizing neural networks and user-interface guidelines comprising:
providing an interface-design file to a design-component-neural network, wherein the interface-design file contains a design component;
performing a step for classifying the design component as a platform widget for a computing platform utilizing the design-component-neural network; and
based on classifying the design component as the platform widget, determining whether the design component within the interface-design file complies with a user-interface guideline for the platform widget.

18. The computer-implemented method of claim 17, wherein determining whether the design component complies with the user-interface guideline for the platform widget comprises determining that the design component complies with the user-interface guideline for the platform widget.

19. The computer-implemented method of claim 18, further comprising, based on determining that the design component complies with the user-interface guideline for the platform widget, presenting within a user interface of a client device a compliance indication that the design component complies with the user-interface guideline for the platform widget.

20. The computer-implemented method of claim 17, wherein determining whether the design component complies with the user-interface guideline for the platform widget comprises determining that the design component does not comply with the user-interface guideline for the platform widget by:
based on categorizing the design component as the platform widget, identifying nodal properties of a graphic node corresponding to the design component;
comparing the nodal properties of the graphic node with widget-guideline properties from user-interface guidelines for the platform widget; and
determining that a nodal property of the graphic node corresponding to the design component does not comply with a widget-guideline property from the user-interface guideline for the platform widget.

* * * * *